(12) United States Patent
Jang et al.

(10) Patent No.: US 12,055,729 B2
(45) Date of Patent: Aug. 6, 2024

(54) CAMERA MODULE INCLUDING FLEXIBLE SUBSTRATES

(71) Applicant: SAMSUNG ELECTRO-MECHANICS CO., LTD., Suwon-si (KR)

(72) Inventors: Ki Hoon Jang, Suwon-si (KR); Gab Yong Kim, Suwon-si (KR); Sang Ho Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/507,046

(22) Filed: Oct. 21, 2021

(65) Prior Publication Data

US 2022/0244562 A1 Aug. 4, 2022

(30) Foreign Application Priority Data

Feb. 1, 2021 (KR) .......................... 10-2021-0014264

(51) Int. Cl.
 *G02B 27/64* (2006.01)
 *G03B 5/06* (2021.01)
 (Continued)

(52) U.S. Cl.
 CPC ............. *G02B 27/646* (2013.01); *G03B 5/06* (2013.01); *H04N 23/51* (2023.01); *H04N 23/687* (2023.01); *G03B 2205/0023* (2013.01)

(58) Field of Classification Search
 CPC ............... G02B 27/646; G03B 5/06; G03B 2205/0023; H04N 5/2252; H04N 5/23287; H04N 5/2251; H04N 5/2257; H04N 5/2254; H04N 5/2253; H05K 1/147; H05K 2201/10121
 See application file for complete search history.

(56) References Cited

U.S. PATENT DOCUMENTS 7,679,647 B2 * 3/2010 Stavely ................. G03B 17/02
                                                       348/208.99
2012/0236422 A1   9/2012 Sue et al.
(Continued)

FOREIGN PATENT DOCUMENTS

CN      111183384 A      5/2020
CN      113678428 A     11/2021
(Continued)

OTHER PUBLICATIONS

Korean Office Action issued on Apr. 13, 2022, in the counterpart Korean Patent Application No. 10-2021-0014264. (7 pages in English and 5 pages in Korean).
(Continued)

*Primary Examiner* — Padma Haliyur
(74) *Attorney, Agent, or Firm* — NSIP Law

(57) ABSTRACT

A camera module includes: a housing; an optical assembly configured to tilt with respect to the housing, and including a lens system and a sensor substrate having an image sensor; a main substrate disposed in the housing and spaced apart from the sensor substrate; and a first flexible substrate and a second flexible substrate configured to connect the sensor substrate to the main substrate. The first flexible substrate and the second flexible substrate are disposed to at least partially overlap each other.

19 Claims, 14 Drawing Sheets

(51) Int. Cl.
 *H04N 23/51* (2023.01)
 *H04N 23/68* (2023.01)

(56) References Cited

U.S. PATENT DOCUMENTS

| | | |
|---|---|---|
| 2018/0120531 A1 | 5/2018 | Sasaki et al. |
| 2018/0284476 A1 | 10/2018 | Minamisawa |
| 2019/0141248 A1 | 5/2019 | Hubert et al. |
| 2020/0012068 A1* | 1/2020 | Lim .................. H04N 5/23287 |
| 2020/0409166 A1 | 12/2020 | Park |
| 2021/0321024 A1* | 10/2021 | Song .................. H04N 5/2257 |
| 2022/0086317 A1* | 3/2022 | Paik .................. H04N 5/2252 |
| 2022/0137486 A1* | 5/2022 | Oh ...................... G02B 7/023 359/554 |
| 2022/0179230 A1* | 6/2022 | Sue .................... H05K 1/181 |

FOREIGN PATENT DOCUMENTS

| | | | |
|---|---|---|---|
| EP | 3 952 274 A1 | 2/2022 | |
| JP | 2010-212466 A | 9/2010 | |
| JP | 5551903 B2 | 7/2014 | |
| JP | 2017-181675 A | 10/2017 | |
| JP | 2018-169500 A | 11/2018 | |
| JP | 6584458 B2 | 10/2019 | |
| KR | 10-2012-0106559 A | 9/2012 | |
| KR | 10-2013-0055136 A | 5/2013 | |
| KR | 10-2020-0002357 A | 1/2020 | |
| KR | 10-2106525 B1 | 5/2020 | |
| KR | 10-2020-0114252 A | 10/2020 | |
| WO | WO-2020045960 A1 * | 3/2020 | ............. H01F 7/081 |
| WO | WO-2020197149 A1 * | 10/2020 | ............... G02B 3/12 |

OTHER PUBLICATIONS

Chinese Office Action issued on Mar. 8, 2024, in counterpart Chinese Patent Application No. 202210030187.4 (4 pages in English, 6 pages in Chinese).

* cited by examiner

CAMERA MODULE INCLUDING FLEXIBLE SUBSTRATES

CROSS-REFERENCE TO RELATED APPLICATIONS

This application claims the benefit under 35 U.S.C. § 119(a) of Korean Patent Application No. 10-2021-0014264 filed on Feb. 1, 2021 in the Korean Intellectual Property Office, the entire disclosure of which is incorporated herein by reference for all purposes.

BACKGROUND

1. Field

The following description relates to a camera module, and for example, a camera module having an improved optical image stabilization function.

2. Description of Related Art

Camera modules are commonly employed in mobile communication terminals such as smartphones, tablet PCs, and laptops.

A camera module for a mobile communication terminal may include an actuator configured to move a lens module for focus adjustment and optical image stabilization, and generally, the actuator may move the lens module in an optical axis direction and in a direction perpendicular to the optical axis by driving force of a magnet and a coil. However, since shaking generated in the camera module may not always occur in a direction perpendicular to an optical axis, when the lens module is moved in a direction perpendicular to the optical axis, there may be a limitation to optical image stabilization.

Also, when the shaking occurs continuously, such as in taking a video, it may be difficult to precisely correct the shaking. Further, when an object to be imaged moves during video capturing, a user may have to directly move the mobile communications terminal to adjust an imaging direction of the camera module to match the moving object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes: a housing; an optical assembly configured to tilt with respect to the housing, and including a lens system and a sensor substrate having an image sensor; a main substrate disposed in the housing and spaced apart from the sensor substrate; and a first flexible substrate and a second flexible substrate configured to connect the sensor substrate to the main substrate. The first flexible substrate and the second flexible substrate are disposed to at least partially overlap each other.

The first flexible substrate and the second flexible substrate may extend along a portion of an edge of the sensor substrate, and at least partially overlap each other in an optical axis direction.

The first flexible substrate and the second flexible substrate may extend outward from different portions of the edge of the sensor substrate, and may include respective portions extending in opposite directions while overlapping each other.

The edge of the sensor substrate may include a first edge extending in a first direction perpendicular to the optical axis. A first portion of the first flexible substrate may extend outward from a portion of the first edge and extends in the first direction. A portion of the second flexible substrate may extend outward from another portion of the first edge and extends in a second direction opposite to the first direction, and may overlap at least a portion of the first portion of the first flexible substrate.

The first flexible substrate may extend around a perimeter of the sensor substrate in a counterclockwise direction with respect to the optical axis, and the second flexible substrate may extend around the perimeter of the sensor substrate in a clockwise direction with respect to the optical axis.

The edge of the sensor substrate may include a first edge and a second edge opposing each other. The first flexible substrate and the second flexible substrate may extend outward from the first edge and may be connected to an inner edge of the main substrate opposing the second edge.

The first flexible substrate and the second flexible substrate may be connected to a same portion of the inner edge of the main substrate.

The camera module may further include: a first frame configured to tilt with respect to a first axis perpendicular to the optical axis in the housing; and a second frame configured to tilt with respect to a second axis perpendicular to the optical axis and intersecting the first axis, with respect to the first frame. The optical assembly may be coupled to the second frame and is configured to tilt with respect to the first axis and the second axis, with respect to the housing.

An end of the first flexible substrate and an end of the second flexible substrate may be respectively connected to the sensor substrate at portions of the sensor substrate that overlap each other in a view in an optical axis direction.

An end of the first flexible substrate and an end of the second flexible substrate may be respectively connected to the sensor substrate at portions of the sensor substrate that do not overlap each other in a view in an optical axis direction.

In another general aspect, a camera module includes: a housing; an optical assembly configured to tilt with respect to the housing, and including a lens system and a sensor substrate having an image sensor; a main substrate disposed in the housing and spaced apart from the sensor substrate; and a first flexible substrate and a second flexible substrate configured to connect the sensor substrate to the main substrate. The optical assembly is configured to tilt with respect to a first axis and a second axis, with respect to the housing, and the first and second axes are perpendicular to the optical axis and intersect each other. The sensor substrate includes an edge including first and second edges opposing each other. The first edge extends from a first end to a second end in a first direction. The second edge extends from a third end to a fourth end in the first direction. The first axis corresponds to a diagonal from the first end to the fourth end and the second axis corresponds to a diagonal from the second end to the third end. The first flexible substrate and the second flexible substrate extend along the edge of the sensor substrate, and at least partially overlap each other in a region between the first end and the second end.

The first flexible substrate may extend outward from a first portion of the first edge, and may extend around a perimeter of the sensor substrate in a direction from the first portion to the first end. The second flexible substrate may extend outward from a second portion of the first edge, and may extend around the perimeter of the sensor substrate in a direction from the second portion to the second end. A first distance between the first portion and the first axis may be greater than a second distance between the second portion and the first axis, in a view in an optical axis direction.

A third distance between the first portion and the second axis may be equal to the second distance, and a fourth distance between the second portion and the second axis may be equal to the first distance, in a view in the optical axis direction.

A third portion connected to the first flexible substrate on an edge of the main substrate and a fourth portion connected to the second flexible substrate on an edge of the main substrate may be disposed at a same distance from the first axis and the second axis.

The first flexible substrate may extend outward from a first portion of the first edge, and may extend around a perimeter of the sensor substrate in a direction from the first portion to the first end. The second flexible substrate may extend outward from a second portion of the first edge, and may extend around the perimeter of the sensor substrate in a direction from the second portion to the second end. A distance between the first portion and the first axis may be greater than a distance between the first portion and the second axis, and a distance between the second portion and the first axis may be less than a distance between the second portion and the second axis, in a view in the optical axis direction.

The first flexible substrate and the second flexible substrate may be disposed symmetrically with respect to a central line dividing the first axis and the second axis and passing the first edge.

The main substrate may include an inner edge surrounding the edge of the sensor substrate. The first flexible substrate and the second flexible substrate may be disposed between the inner edge of the main substrate and the edge of the sensor substrate.

The camera module may further include: a first frame configured to tilt with respect to the first axis, in the housing; and a second frame configured to tilt with respect to the second axis, with respect to the first frame. The optical assembly may be coupled to the second frame.

Other features and aspects will be apparent from the following detailed description, the drawings, and the claims.

Figure 1:
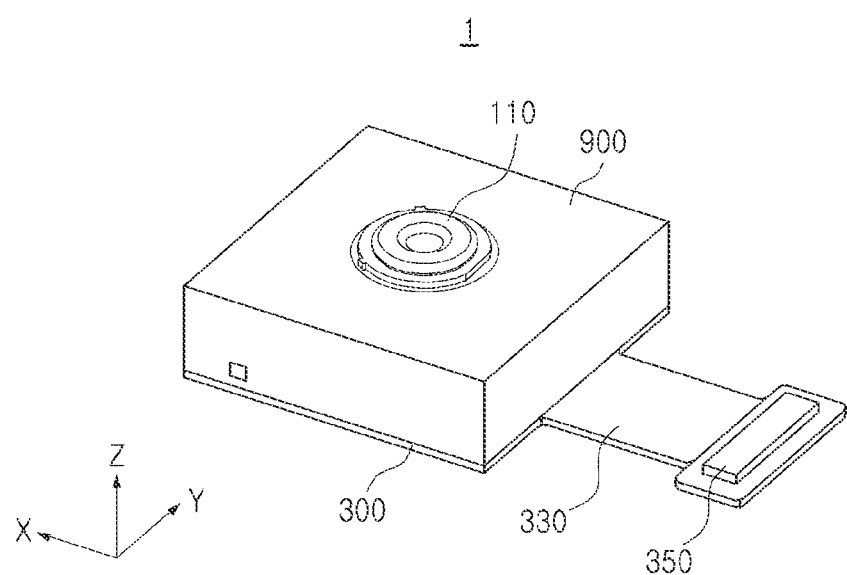
FIG. 1 is a diagram illustrating a camera module, according to an embodiment.

Throughout the drawings and the detailed description, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various ways as will be apparent after an understanding of this disclosure. Further, although the examples described herein have a variety of configurations, other configurations are possible as will be apparent after an understanding of this disclosure.

Figure 2:
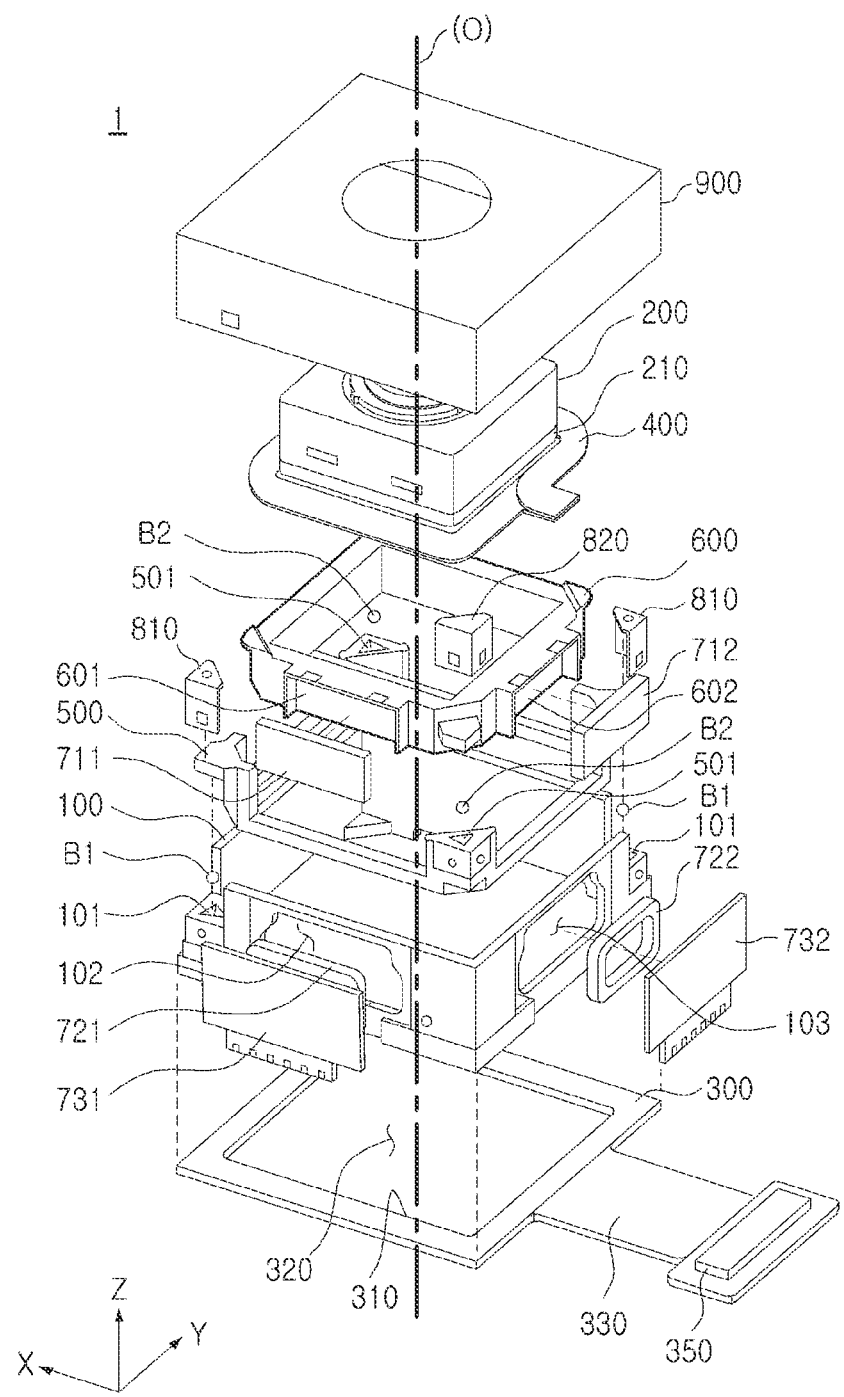
FIG. 2 is an exploded perspective diagram illustrating the camera module of FIG. 1, according to an embodiment.
Figure 3:
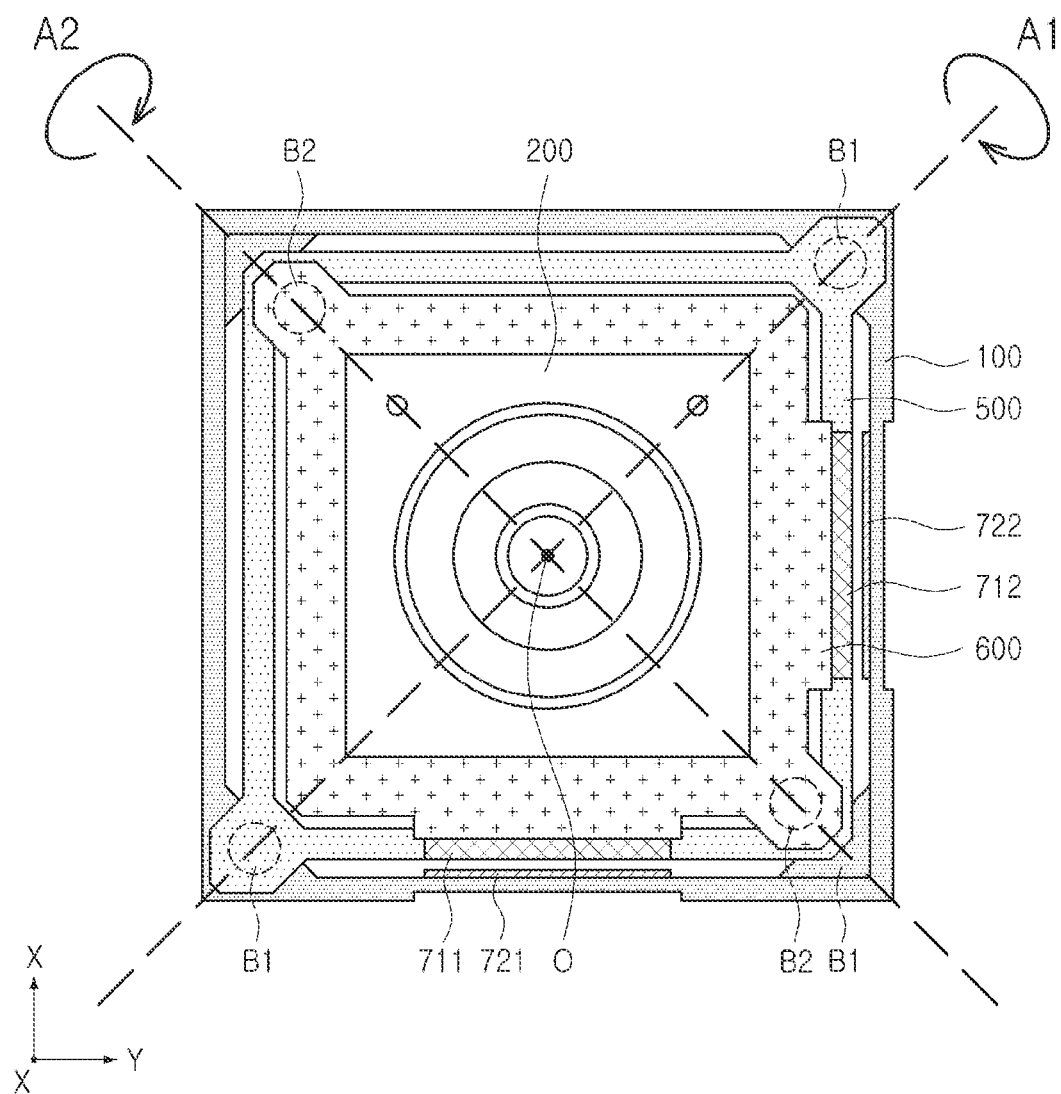
FIG. 3 is a diagram illustrating the camera module of FIG. 1, viewed from above, according to an embodiment.

FIG. 1 is a diagram illustrating a camera module 1, according to an embodiment. FIG. 2 is an exploded perspective diagram illustrating the camera module 1, according to an embodiment. FIG. 3 is a diagram illustrating the camera module 1, viewed from above, according to an example embodiment.

Referring to FIGS. 1 and 2, the camera module 1 may include a housing 100 and an optical assembly 200 disposed in the housing 100. The optical assembly 200 may include a lens system and an image sensor 230. The optical assembly 200 may include a driver configured to shift the lens assembly or the image sensor 230 therein. The optical assembly 200 may include a sensor substrate 210 on which the image sensor 230 is mounted, and the sensor substrate 210 may form a bottom of the optical assembly 200.

The sensor substrate 210 may be electrically connected to the main substrate 300. The flexible substrate 400 may electrically connect the sensor substrate 210 to the main substrate 300. A signal output by the image sensor 230 may be transmitted to the main substrate 300 through wires included in the flexible substrate 400, or power may be supplied to the sensor substrate 210 through wires included in the flexible substrate 400. The main substrate 300 may be connected to a connector 350 through an extension portion 330, and may communicate with an external electronic circuit of the camera module 1 through the connector 350.

The sensor substrate 210 may be disposed in a space 320 surrounded by an inner edge 310 of the main substrate 300. In an example, the flexible substrate 400 may be drawn out from a portion of an edge of the sensor substrate 210 and may extend to the main substrate 300. A plurality of the flexible substrates 400 may be provided and may connect the sensor substrate 210 to the main substrate 300. For example, the image sensor 230 may include a plurality of terminals, and a portion of the plurality of terminals may be connected to the main substrate 300 through a first flexible substrate 410 (FIG. 4) of the flexible substrate 400, and the other portion of the plurality of terminals may be connected to the main substrate 300 through a second flexible substrate 420 (FIG. 4) of the flexible substrate 400. The structure of the flexible substrate 400 connecting the sensor substrate 210 to the flexible substrate 400 will be described in greater detail with reference to FIGS. 4 to 14.

In an example, the camera module 1 may have an optical image stabilization function. In an example, the optical assembly 200 may tilt with respect to an axis perpendicular to an optical axis O, with respect to the housing 100.

In an example, the camera module 1 may include a first frame 500 configured to tilt with respect to a first axis A1, with respect to the housing 100. In an example, first ball members B1 may be interposed between the housing 100 and the first frame 500. For example, first ball members B1 may be disposed between a first groove 101 formed on a surface of the housing 100 and the first frame 500. Referring to FIG. 3, the first ball members B1 may be arranged along the first axis A1, and the first frame 500 may rotate in a predetermined range with respect to the first axis A1, with respect to the housing 100.

In an example, the camera module 1 may include a second frame 600 configured to tilt with respect to a second axis A2 with respect to the first frame 500. In an example, second ball members B2 may be interposed between the first frame 500 and the second frame 600. For example, the second ball members B2 may be disposed between a second groove 501 formed in a surface of the first frame 500 and the second frame 600. Referring to FIG. 3, the second ball members B2 may be arranged along the second axis A2, and the second frame 600 may rotate in a predetermined range with respect to the second axis A2, with respect to the first frame 500.

In an example embodiment, the camera module 1 may include a driver for optical image stabilization. The driver may include first and second magnets 711 and 712 disposed in the second frame 600, and first and second coils 721 and 722 disposed in the housing 100. For example, in the second frame 600, the first magnet 711 may be attached to a first surface 601 extending in the X direction (disposed in an XZ plane), and the second magnet 712 may be attached to a second surface 602 extending in the Y direction (disposed in a YZ plane). The first coil 721 and the second coil may be fastened to the housing 100 so as to oppose the first magnet 711 and the second magnet 712, respectively. For example, the first coil 721 and the second coil 722 may be attached to the substrates 731 and 732, respectively, and the substrates 731 and 732 may be attached to the housing 100 such that the first coil 721 and the second coil 722 may be fastened to the housing 100. The optical assembly 200 may rotate about an axis perpendicular to the optical axis O with respect to the housing 100, by electromagnetic interaction between the first and second coils 721 and 722 and the first and second magnets 711 and 712, respectively.

In an example, the camera module 1 may include a shield can 900 configured to cover a portion of the housing 100 and to form a portion of an exterior of the camera module 1.

In an example, the camera module 1 may include first and second stoppers 810 and 820 configured to limit a movement range of the first frame 500 and the second frame 600, respectively.

The first stopper 810 may be configured to prevent deviation of the first frame 500 in the +Z direction. Referring to FIG. 2, the first stopper 810 may be inserted around the first groove 101 of the housing 100. When the first stopper 810 is inserted into the housing 100, a portion of the first stopper 810 may be disposed on a portion of the first frame 500, such that the first frame 500 may be prevented from being deviated from the housing 100 in the +Z direction.

The second stopper 820 may be configured to prevent deviation of the second frame 600 in the +Z direction. Referring to FIG. 2, the second stopper 820 may be inserted around the second groove of the housing 100. When the second stopper 820 is inserted into the housing 100, a portion of the second stopper 820 may be disposed on a portion of the second frame 600, such that the second frame 600 may be prevented from being deviated from the housing 100 in the +Z direction.

Figure 4:
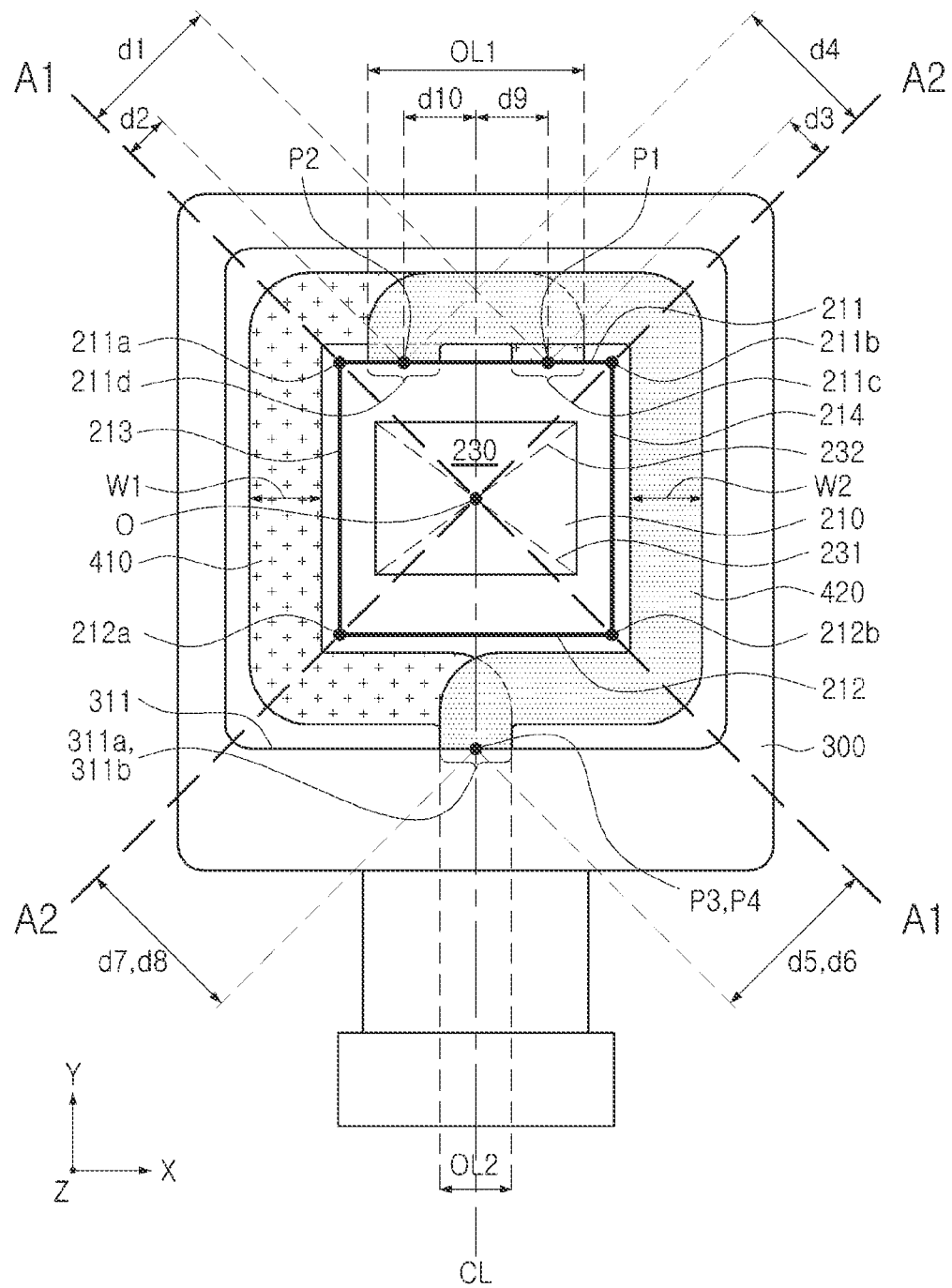
FIG. 4 is a diagram illustrating a connection structure between a sensor substrate and a main substrate, according to an embodiment.
Figure 5:
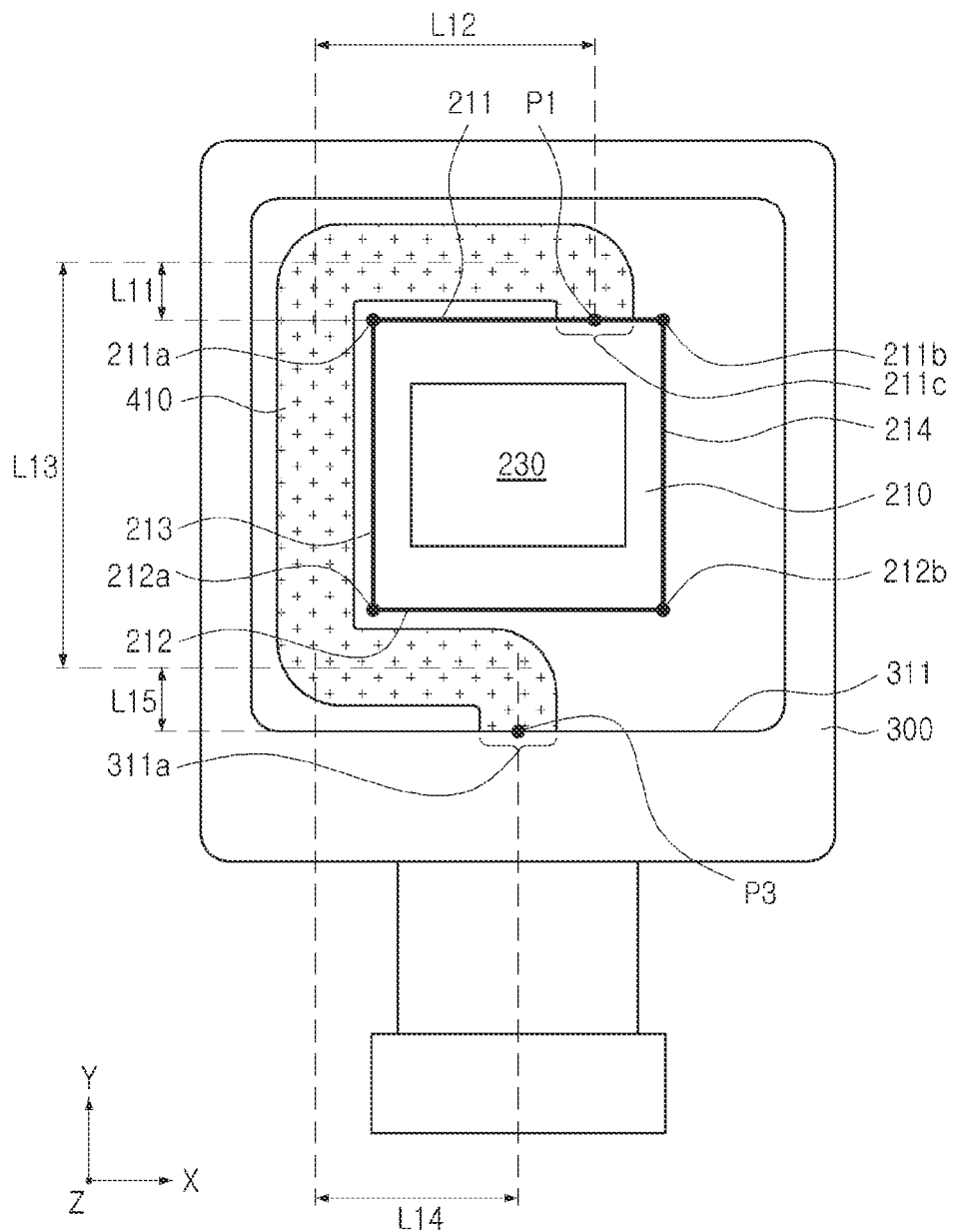
FIG. 5 is a diagram illustrating a portion of the flexible substrate illustrated in FIG. 4.
Figure 6:
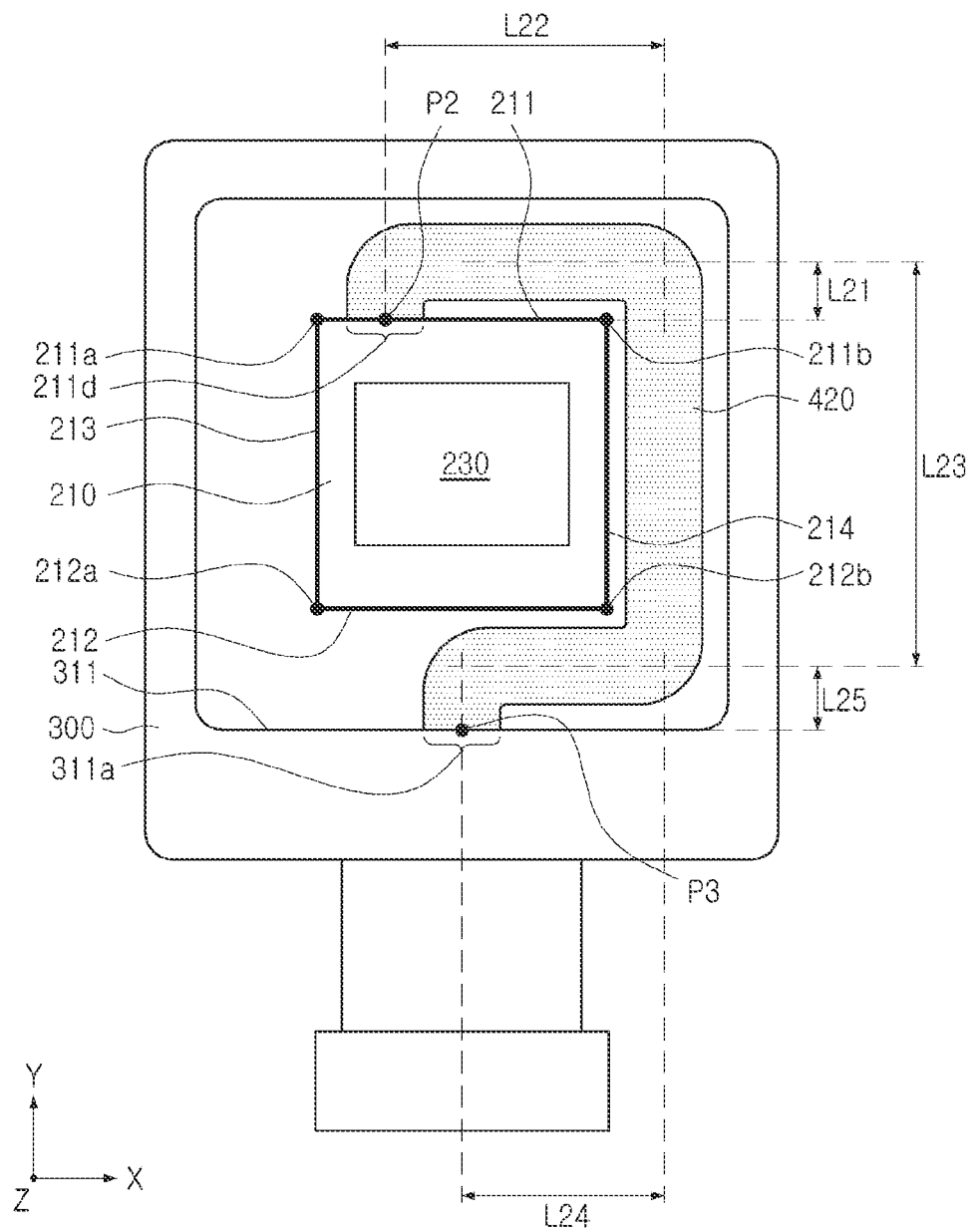
FIG. 6 is a diagram illustrating a portion of the flexible substrate illustrated in FIG. 4.

FIG. 4 is a diagram illustrating a connection structure between the sensor substrate 210 and the main substrate 300, according to an embodiment. FIG. 5 is a diagram illustrating a portion of the flexible substrate 400 illustrated in FIG. 4. FIG. 6 is a diagram illustrating a portion of the flexible substrate 400 illustrated in FIG. 4.

In an embodiment, the sensor substrate 210 and the main substrate 300 may be connected to each other through the flexible substrate 400. In an example, the main substrate 300 may surround an edge of the sensor substrate 210. For example, referring to FIG. 4, the sensor substrate 210 may have the form of a rectangular plate, and the main substrate 300 may have the form of a rectangular frame surrounding edges 211, 212, 213, and 214 of the sensor substrate 210. An inner edge 310 of the main substrate 300 may surround the edges 211, 212, 213, and 214 of the sensor substrate 210, and the flexible substrate 400 may be disposed between the inner edge 310 of the main substrate 300 and the edges 211, 212, 213, and 214 of the sensor substrate 210.

In an example, a plurality of the flexible substrates 400 for connecting the sensor substrate 210 to the main substrate 300 may be provided. A plurality of wires through which an electrical signal or power may be transmitted may need to be provided between the sensor substrate 210 and the main substrate 300. For example, the image sensor 230 may include a plurality of terminals, and a single wire may be necessary for each of the terminals. A plurality of wirings may be divided and disposed on the plurality of flexible substrates 400. Referring to FIG. 4, the first flexible substrate 410 and the second flexible substrate 420 may connect the sensor substrate 210 to the main substrate 300. An electrical signal or power may be transmitted through electrical wirings included in the first flexible substrate 410 and the second flexible substrate 420.

In an example, the first flexible substrate 410 and the second flexible substrate 420 may be disposed along the edges 211, 212, 213, and 214 of the sensor substrate 210. In the example, the configuration in which the flexible substrate 400 may be disposed along the edges 211, 212, 213, and 214 of the sensor substrate 210 may be a configuration in which the flexible substrate 400 is disposed to surround the sensor substrate 210 while the flexible substrate 400 is spaced apart from the edges 211, 212, 213, and 214 of the sensor substrate 210 by a predetermined distance. Accordingly, the flexible substrate 400 may be disposed between the edges 211, 212, 213, and 214 of the sensor substrate 210 and the inner edge 310 of the main substrate 300.

In an example embodiment, the first flexible substrate 410 and the second flexible substrate 420 may be disposed to at least partially overlap each other. The first flexible substrate 410 and the second flexible substrate 420 may extend along the edges 211, 212, 213, and 214 of the sensor substrate 210 in a direction perpendicular to the optical axis O, and may at least partially overlap each other in a direction perpendicular to the optical axis O. In other words, when the flexible substrate 400 is viewed in a direction parallel to the optical axis O, a portion of the first flexible substrate 410 may not be visible due to the second flexible substrate 420. In the example illustrated in FIG. 4, the second flexible substrate 420 may be disposed in the +Z direction with respect to the first flexible substrate 410, such that a portion of the first flexible substrate 410 is covered by the second flexible substrate 420, but is the first and second substrates 410 and 420 are not limited to such a configuration. In another example, the first flexible substrate 410 may be disposed in the +Z direction with respect to the second flexible substrate 420. In another example, a portion of the first flexible substrate 410 may be disposed on the second flexible substrate 420, and a portion of the second flexible substrate 420 may be disposed on the first flexible substrate 410, which may be the same in the embodiments described with reference to FIGS. 7 to 14.

In an example, the first flexible substrate 410 and the second flexible substrate 420 may detour (e.g., extend outside of the sensor substrate 210, in a path around a perimeter of the sensor substrate 210) the sensor substrate 210 in opposite directions and may be connected to the main substrate 300. In an example, the first flexible substrate 410 may detour the sensor substrate 210 in a counterclockwise direction with respect to the optical axis O, and the second flexible substrate 420 may detour the sensor substrate 210 in a clockwise direction with respect to the optical axis O.

For example, the first flexible substrate 410 may extend in the −X direction along a portion of the first edge 211, may extend in the −Y direction along the third edge 213, may extend along a portion of the second edge 212, and may be connected to the inner edge of the main substrate 300. The second flexible substrate 420 may extend along a portion of the first edge 211 in the +X direction, may extend along the fourth edge 214 in the −Y direction, may extend along a portion of the second edge 212, and may be connected to the inner edge 310 of the main substrate 300.o In an example, the first flexible substrate 410 and the second flexible substrate 420 may be drawn out from different portions of the first edge 211. For example, when the sensor substrate 210 is viewed in a direction parallel to the optical axis O, the portion to which the first flexible substrate 410 is connected may be distinct from the portion to which the second flexible substrate 420 is connected. For example, the first flexible substrate 410 may extend from the first portion 211c of the first edge 211 in the +Y direction, and the second flexible substrate 420 may extend from the second portion 211d of the first edge 211 in the +Y direction. The first flexible substrate 410 and the second flexible substrate 420 may extend in opposite directions along the first edge 211. For example, the first flexible substrate 410 may extend in the −X direction after being drawn out from the first portion 211c, and the second flexible substrate 420 may extend in the +X direction after being drawn out from the second portion 211d.

In an example, the first flexible substrate 410 and the second flexible substrate 420 may at least partially overlap each other on the first edge 211. Since the first portion 211c is spaced apart from the second portion 211d in the +X direction, the first flexible substrate 410 and the second flexible substrate 420 may partially overlap each other in the region OL1 between the first portion 211c and the second portion 211d.

In an example, the flexible substrate 400 may detour the sensor substrate 210 and may be connected to the main substrate 300. In an example embodiment, the flexible substrate 400 may be drawn out from the first edge 211 of the sensor substrate 210, and may extend to the second edge 212 opposing the first edge 211. The portion of the flexible substrate 400 extending to the second edge 212 may be connected to a portion of the first inner edge 311 opposing the second edge 212 of the inner edge 310 of the main substrate 300.

Referring back to FIG. 3, in an example, the optical assembly 200 may rotate about the first axis A1 and the second axis A2, perpendicular to the optical axis O, with respect to the housing 100. Since the sensor substrate 210 is fastened to the optical assembly 200, and the main substrate 300 is fastened to the housing 100, the sensor substrate 210 may rotate about the first axis A1 and the second axis A2 with respect to the main substrate 300.

In an example embodiment, the first edge 211 may extend from the first end 211a to the second end 211b in the +X direction, and the second edge 212 may extend from the third end 212a to the fourth end 212b in the +X direction, while opposing the first edge 211. In this case, the first axis A1 may correspond to a diagonal from the first end 211a to the fourth end 212b, and the second axis A2 may correspond to a diagonal from the second end 211b to the third end 212a. Alternatively, the first axis A1 may correspond to the first diagonal 231 of the image sensor 230, and the second axis A2 may correspond to the second diagonal 232 of the image sensor 230. The configuration in which the first axis A1 or the second axis A2 may correspond to the diagonal may indicate that the first axis A1 and the second axis A2 may coincide or almost coincide with the diagonal direction.

The first flexible substrate 410 and the second flexible substrate 420 may at least partially overlap each other around the first edge 211 connecting the first end 211a to the second end 211b.

The first flexible substrate 410 may be drawn out from the first portion 211c and may detour the sensor substrate 210 in a direction (counterclockwise direction) toward the first end 211a. The second flexible substrate 420 may be drawn out from the second portion 211d and may detour sensor substrate 210 in a direction (clockwise direction) toward the second end 211b.

In an embodiment, a first distance d1 between the first portion 211c in which the first flexible substrate 410 is connected to the sensor substrate 210 and the first axis A1 may be greater than a second distance d2 between the second portion 211d in which the second flexible substrate 420 is connected to the sensor substrate 210 and the first axis A1. The first distance d1 and the second distance d2 may be defined by the shortest distance between a central point P1 of the first portion 211c and the first axis A1 and the shortest distance between a central point P2 of the second portion 211d and the first axis A1, respectively.

In an example, a third distance d3 between the first portion 211c in which the first flexible substrate 410 is connected to the sensor substrate 210 and the second axis A2 may be less than a fourth distance d4 between the second portion 211d in which the second flexible substrate 420 is connected to the sensor substrate 210 and the second axis A2. The third distance d3 and the fourth distance d4 may be defined by the shortest distance between the central point P1 of the first portion 211c and the second axis A2, and the shortest distance between the central point P2 of the second portion 211d and the second axis A2, respectively.

In an example embodiment, the first distance d1 may be greater than the third distance d3, and the second distance d2 may be shorter than the fourth distance d4.

When the optical assembly 200 rotates with respect to the housing 100, the flexible substrate 400 may interfere with the rotation of the optical assembly 200. Accordingly, the flexible substrate 400 may adversely affect the optical image stabilization function. To reduce this adverse effect, the flexible substrate 400 may be configured to be elongated. In other words, by increasing an extension length from the main substrate 300 to the sensor substrate 210, the influence of the substrate on the rotation of the optical assembly 200 may be reduced. In an example, the first flexible substrate 410 and the second flexible substrate 420 may extend until the substrates overlap each other along the edges 211, 212, 213, and 214 of the sensor substrate 210, such that the optical image stabilization function may improve.

In an example, the first flexible substrate 410 and the second flexible substrate 420 may be connected to a portion of the inner edge 310 of the main substrate 300. The first flexible substrate 410 may be connected to the third portion 311a of the first inner edge 311, and the second flexible substrate 420 may be connected to the fourth portion 311b of the first inner edge 311.

In an embodiment, the first portion 211c and the second portion 211d may be disposed in the same position when viewed in a direction parallel to the optical axis O. For example, a fifth distance d5 between the third portion 311a and the first axis A1 may coincide with a sixth distance d6 between the fourth portion 311b and the first axis A1. Alternatively, a seventh distance d7 between the third portion 311a and the second axis A2 may coincide with an eighth distance d8 between the fourth portion 311b and the second axis A2. Accordingly, the first flexible substrate 410 and the second flexible substrate 420 may overlap each other in the region OL2 extending from the second edge 212 of the sensor substrate 210 to the first inner edge 311 of the main substrate 300.

In an example, the first flexible substrate 410 and the second flexible substrate 420 may be configured to be symmetrical. The central line CL may divide the first axis A1 and the second axis A2 and may be parallel to the Y axis in the illustrated embodiment. Referring to FIG. 4, the first flexible substrate 410 and the second flexible substrate 420 may be disposed symmetrically with respect to a central line CL parallel to the Y-axis.

Referring to FIGS. 5 and 6, the first flexible substrate 410 may extend from the first portion 211c by a first length L11 in the +Y direction, may extend by a second length L12 in the −X direction along the first edge 211, may extend by a third length L13 along the third edge 213, may extend by a fourth length L14 in the +X direction along the second edge 212, and may extend by a fifth length L15 in the −Y direction. The second flexible substrate 420 may extend from the second portion 211d by a sixth length L21 in the +Y direction, may extend by a seventh length L22 in the +X direction along the first edge 211, may extend by a ninth length L24 in the −X direction along the second edge 212, and may extend by a tenth length L25 in the −Y direction. In an example, the first flexible substrate 410 and the second flexible substrate 420 may be disposed symmetrically to each other on the central line CL, and, for example, the first length L11, the second length L12, the third length L13, the fourth length L14, and the fifth length L15 may coincide with the sixth length L21, the seventh length L22, the eighth length L23, and the ninth length L24, and the tenth length L25, respectively. As another example, a sum of the first to fifth lengths L11 to L15 may be equal to a sum of the sixth to tenth lengths L21 to L25.

In an example, the third distance d3 may be equal to the second distance d2, and the fourth distance d4 may be equal to the first distance d1. In an example, the ninth distance d9 from the central line CL to the first portion 211c may coincide with the tenth distance d10 from the central line CL to the second portion 211d. The ninth distance d9 may be defined by the shortest distance between the central point P1 of the first portion 211c and the central line CL, and the tenth distance d10 may be defined by the shortest distance between the central point P2 of the second portion 211d and the central line CL.

In an example, the fifth distance d5 between the third portion 311a and the first axis A1 may coincide with the eighth distance d8 between the fourth portion 311b and the second axis A2. In an example embodiment, the seventh distance d7 between the third portion 311a and the second axis A2 may coincide with the sixth distance d6 between the fourth portion 311b and the first axis A1. The distance may be defined by the shortest distance between the central point P3 of the third portion 311a or the central point P4 of the fourth portion 311b and the first axis A1 or the second axis A2.

In an example, an eleventh distance d11 from the central line CL to the central point P3 of the third portion 311a may be equal to a twelfth distance d11 from the central line CL to the central point P4 of the fourth portion 311b.

In an example, a width W1 of the first flexible substrate 410 may be equal to a width W2 of the second flexible substrate 420.

Since the first flexible substrate 410 and the second flexible substrate 420 are configured symmetrically with respect to the central line CL, resistive force acting on the optical assembly 200 due to the flexible substrate 400 when the optical assembly 200 rotates about the first axis A1 with respect to the housing 100, and resistive force acting on the optical assembly 200 due to the flexible substrate 400 when the optical assembly 200 rotates about the second axis A2 may be symmetrical. Accordingly, an optical image stabilization function of the camera module 1 may improve.

Figure 7:
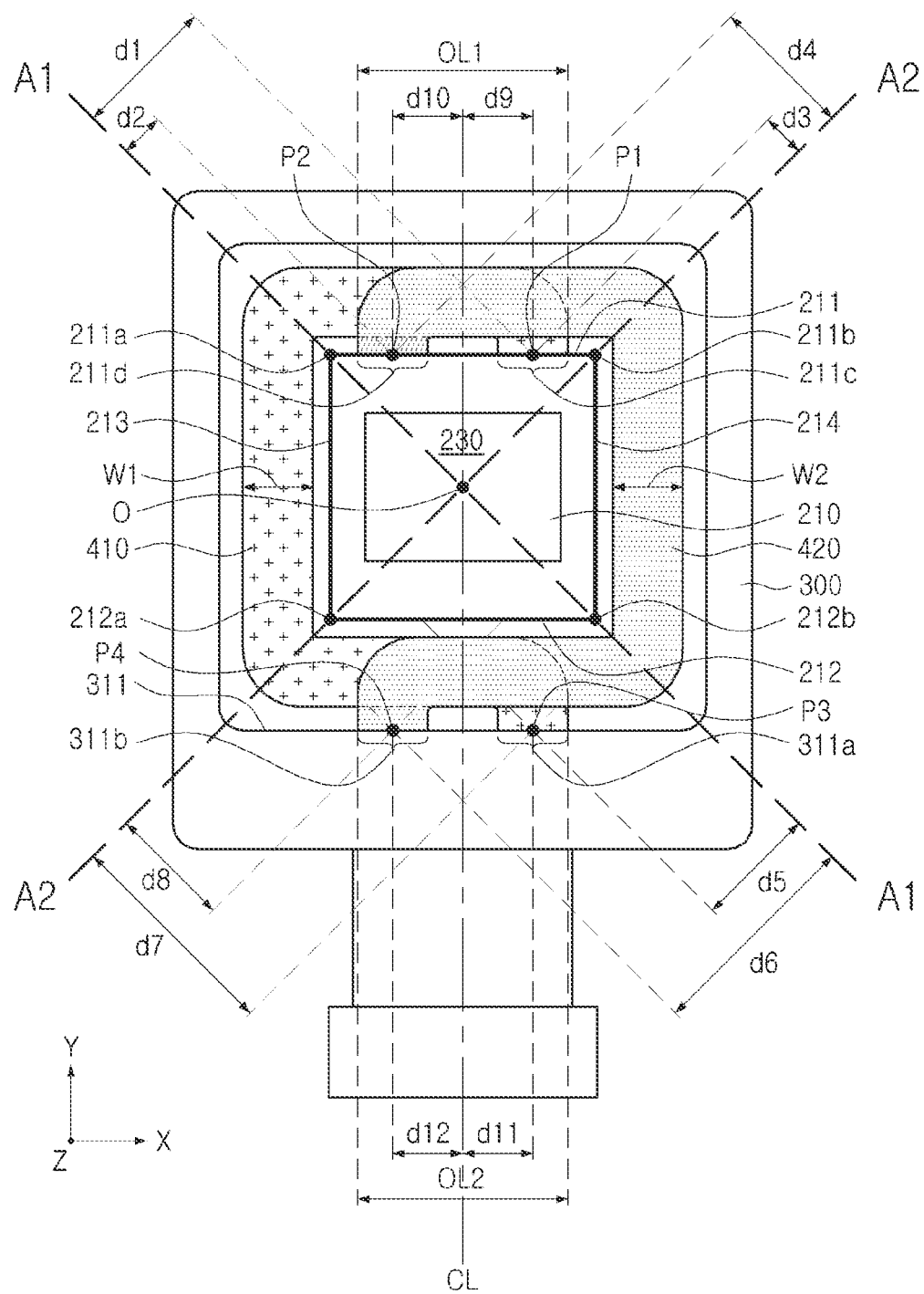
FIG. 7 is a diagram illustrating a connection structure between a sensor substrate and a main substrate, according to an embodiment.

FIG. 7 is a diagram illustrating a connection structure between the sensor substrate 210 and the main substrate 300, according an embodiment.

In an example, the first flexible substrate 410 and the second flexible substrate 420 may be disposed along the edges 211, 212, 213, and 214 of the sensor substrate 210. In an example, the first flexible substrate 410 and the second flexible substrate 420 may be disposed to at least partially overlap each other. The first flexible substrate 410 and the second flexible substrate 420 may extend along the edges 211, 212, 213, and 214 of the sensor substrate 210 in a direction perpendicular to the optical axis O, and may at least partially overlap each other in a direction perpendicular to the optical axis O. In other words, when the flexible substrate 400 is viewed in a direction parallel to the optical axis O, a portion of the first flexible substrate 410 may not be visible due to the second flexible substrate 420.

In an example embodiment, the first flexible substrate 410 and the second flexible substrate 420 may detour (e.g., extend along a path around) the sensor substrate 210 in opposite directions and may be connected to the main substrate 300. In an example, the first flexible substrate 410 may detour the sensor substrate 210 in a counterclockwise direction with respect to the optical axis O, and the second flexible substrate 420 may detour the sensor substrate 210 in a clockwise direction with respect to the optical axis O.

For example, the first flexible substrate 410 may extend in the −X direction along a portion of the first edge 211, may extend in the −Y direction along the third edge 213, may extend in the +X direction along a portion of the second edge 212, and may be connected to the inner edge 310 of the main substrate 300. The second flexible substrate 420 may extend in the +X direction along a portion of the first edge 211, may extend in the −Y direction along the fourth edge 214, may extend in the −X direction along a portion of the second edge 212, and may be connected to the inner edge 310 of the main substrate 300.

In an example, the first flexible substrate 410 and the second flexible substrate 420 may be drawn out from different portions of the first edge 211. For example, the first flexible substrate 410 may extend from the first portion 211c of the first edge 211 in the +Y direction, and the second flexible substrate 420 may extend from the second portion 211d of the first edge 211 in the +Y direction. The first flexible substrate 410 and the second flexible substrate 420 may extend in opposite directions on the first edge 211. For example, the first flexible substrate 410 may be drawn out from the first portion 211c and may extend in the −X direction, and the second flexible substrate 420 may be drawn out from the second portion 211d and may extend in the +X direction.

In an example, the first flexible substrate 410 and the second flexible substrate 420 may at least partially overlap each other on the first edge 211. Since the first portion 211c is spaced apart from the second portion 211d in the +X direction, the first flexible substrate 410 and the second flexible substrate 420 may at least partially overlap each other in the region OL1 between the first portion 211c and the second portion 211d.

In an example, the flexible substrate 400 may detour the sensor substrate 210 and may be connected to the main substrate 300. In an example, the flexible substrate 400 may be drawn out from the first edge 211 of the sensor substrate 210, and may extend to the second edge 212 opposing the first edge 211. The portion of the flexible substrate 400 extending to the second edge 212 may be connected to a portion of the first inner edge 311 (opposing the second edge 212) of the inner edge 310 of the main substrate 300.

Referring back to FIG. 3, in an example, the optical assembly 200 may rotate about the first axis A1 and the second axis A2 perpendicular to the optical axis O with respect to the housing 100. Since the sensor substrate 210 is fastened to the optical assembly 200, and the main substrate 300 is fastened to the housing 100, the sensor substrate 210 may rotate about the first axis A1 and the second axis A2 with respect to the main substrate 300.

Referring to FIG. 7, in an example, the first edge 211 may extend from the first end 211a to the second end 211b in the +X direction, and the second edge 212 may extend from the third end 212a to the fourth end 212b in the +X direction, while opposing the first edge 211. In this case, the first axis A1 may correspond to a diagonal from the first end 211a to the fourth end 212b, and the second axis A2 may correspond to a diagonal from the second end 211b to the third end 212a. Alternatively, the first axis A1 may correspond to the first diagonal 231 of the image sensor 230, and the second axis A2 may correspond to the second diagonal 232 of the image sensor 230.

The first flexible substrate 410 and the second flexible substrate 420 may at least partially overlap each other around the first edge 211.

The first flexible substrate 410 may detour the sensor substrate 210 in a direction (counterclockwise direction) toward the first end 211a after being drawn out from the first portion 211c. The second flexible substrate 420 may detour the sensor substrate 210 in a direction (clockwise direction) toward the second end 211b after being drawn out from the second portion 211d.

In an example, a first distance d1 between the first portion 211c in which the first flexible substrate 410 is connected to the sensor substrate 210 and the first axis A1 may be greater than a second distance d2 between the second portion 211d in which the second flexible substrate 420 is connected to the sensor substrate 210 and the first axis A1. The first distance d1 and the second distance d2 may be defined by the by the shortest distance between the central point P1 of the first portion 211c and the first axis A1, and the shortest distance between the central point P2 of the second portion 211d and the first axis A1, respectively.

In an example, a third distance d3 between the first portion 211c in which the first flexible substrate 410 is connected to the sensor substrate 210 and the second axis A2 may be less than a fourth distance d4 between the second portion 211d in which the second flexible substrate 420 is connected to the sensor substrate 210 and the second axis A2. The third distance d3 and the fourth distance d4 may be defined by the shortest distance between the central point P1 of the first portion 211c and the second axis A2, and the shortest distance between the central point P2 of the second portion 211d and the second axis A2, respectively.

In an example, the first distance d1 may be greater than the third distance d3, and the second distance d2 may be less than the fourth distance d4.

In an example, the first flexible substrate 410 and the second flexible substrate 420 may be connected to a portion of the inner edge 310 of the main substrate 300. The first flexible substrate 410 may be connected to the third portion 311a of the first inner edge 311 opposing the second edge 212, and the second flexible substrate 420 may be connected to the fourth portion 311b of the first inner edge 311.

In an example embodiment, the third portion 311a and the fourth portion 311b may be disposed in different positions when viewed from a direction parallel to the optical axis O. For example, the first flexible substrate 410 may extend beyond the central line CL in the +X direction along the second edge 212, and the second flexible substrate 420 may extend beyond the central line CL in the −X direction along the second edge 212. In this case, the first flexible substrate 410 and the second flexible substrate 420 may overlap each other in the region OL2 between the third portion 311a and the fourth portion 311b. In the illustrated example, the second flexible substrate 420 may be disposed on the first flexible substrate 410, and in another example, the first flexible substrate 410 may be disposed on the second flexible substrate 420.

For example, a fifth distance d5 between the third portion 311a and the first axis A1 may be less than a sixth distance d6 between the fourth portion 311b and the first axis A1. Alternatively, a seventh distance d7 between the third portion 311a and the second axis A2 may be greater than an eighth distance d8 between the fourth portion 311b and the second axis A2.

In an example, the first flexible substrate 410 and the second flexible substrate 420 may be disposed symmetrically. The central line CL may divide the first axis A1 and the second axis A2 and may be parallel to the Y axis in the illustrated example. Referring to FIG. 4, the first flexible substrate 410 and the second flexible substrate 420 may be disposed symmetrically with respect to the central line CL parallel to the Y-axis.

Figure 8:
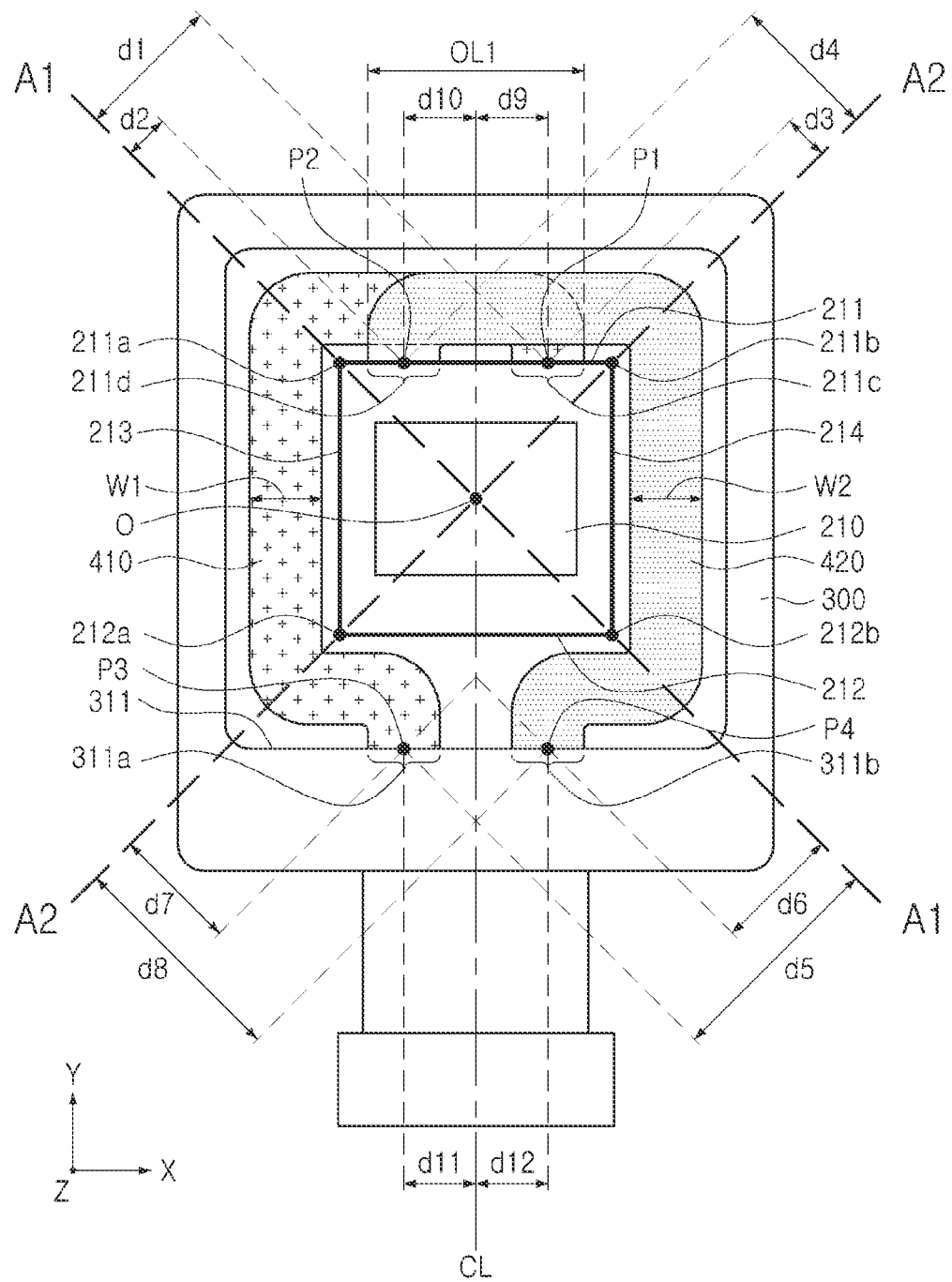
FIG. 8 is a diagram illustrating a connection structure between a sensor substrate and a main substrate, according to an embodiment.

FIG. 8 is a diagram illustrating a connection structure between the sensor substrate 210 and the main substrate 300, according to an embodiment.

In an example, the first flexible substrate 410 and the second flexible substrate 420 may be disposed along the edges 211, 212, 213, and 214 of a sensor substrate 210. In an example, the first flexible substrate 410 and the second flexible substrate 420 may be disposed to at least partially overlap each other. The first flexible substrate 410 and the second flexible substrate 420 may extend in a direction perpendicular to the optical axis O along the edges 211, 212, 213, and 214 of the sensor substrate 210, and may at least partially overlap each other in a direction perpendicular to the optical axis O. In other words, when the flexible substrate 400 is viewed in a direction parallel to the optical axis O, a portion of the first flexible substrate 410 may not be visible due to the second flexible substrate 420.

In an example, the first flexible substrate 410 and the second flexible substrate 420 may detour the sensor substrate 210 in opposite directions and may be connected to the main substrate 300. In an example, the first flexible substrate 410 may detour the sensor substrate 210 in a counterclockwise direction with respect to the optical axis O, and the second flexible substrate 420 may detour the sensor substrate 210 in a clockwise direction with respect to the optical axis O.

For example, the first flexible substrate 410 may extend in the −X direction along a portion of the first edge 211, may extend in the −Y direction along the third edge 213, may extend in the +X direction along a portion of the second edge 212, and may be connected to the inner edge 310 of the main substrate 300. The second flexible substrate 420 may extend in the +X direction along a portion of the first edge 211, may extend in the −Y direction along the fourth edge 214, may extend in the −X direction along a portion of the second edge 212, and may be connected to the inner edge 310 of the main substrate 300.

In an example, the first flexible substrate 410 and the second flexible substrate 420 may be drawn out from different portions of the first edge 211. For example, the first flexible substrate 410 may extend from the first portion 211c of the first edge 211 in the +Y direction, and the second flexible substrate 420 may extend from the second portion 211d of the first edge 211 in the +Y direction. The first flexible substrate 410 and the second flexible substrate 420 may extend in opposite directions on the first edge 211. For example, the first flexible substrate 410 may be drawn out from the first portion 211c and may extend in the −X direction, and the second flexible substrate 420 may be drawn out from the second portion 211d and may extend in the +X direction.

In an example, the first flexible substrate 410 and the second flexible substrate 420 may at least partially overlap each other on the first edge 211. Since the first portion 211c is spaced apart from the second portion 211d in the +X direction, the first flexible substrate 410 and the second flexible substrate 420 may at least partially overlap each other in the region OL1 between the first portion 211c and the second portion 211d.

In an example, the flexible substrate 400 may detour the sensor substrate 210 and may be connected to the main substrate 300. In an example, the flexible substrate 400 may be drawn out from the first edge 211 of the sensor substrate 210, and may extend to the second edge 212 opposing the first edge 211. The portion of the flexible substrate 400 extending to the second edge 212 may be connected to a portion of the first inner edge 311 opposing the second edge 212 of the inner edge 310 of the main substrate 300.

Referring back to FIG. 3, in an example, the optical assembly 200 may rotate about the first axis A1 and the second axis A2 perpendicular to the optical axis O with respect to the housing 100. Since the sensor substrate 210 is fastened to the optical assembly 200, and the main substrate 300 is fastened to the housing 100, the sensor substrate 210 may rotate about the first axis A1 and the second axis A2 with respect to the main substrate 300.

Referring to FIG. 8, in an example, the first edge 211 may extend from the first end 211a to the second end 211b in the +X direction, and the second edge 212 may extend from the third end 212a to the fourth end 212b in the +X direction, while opposing the first edge 211. In this case, the first axis A1 may correspond to a diagonal from the first end 211a to the fourth end 212b, and the second axis A2 may correspond to a diagonal from the second end 211b to the third end 212a. Alternatively, the first axis A1 may correspond to the first diagonal 231 of the image sensor 230, and the second axis A2 may correspond to the second diagonal 232 of the image sensor 230.

The first flexible substrate 410 and the second flexible substrate 420 may at least partially overlap each other around the first edge 211 connecting the first end 211a to the second end 211b.

The first flexible substrate 410 may detour the sensor substrate 210 in a direction (counterclockwise direction) toward the first end 211a after being drawn out from the first portion 211c. The second flexible substrate 420 may detour the sensor substrate 210 in a direction (clockwise direction) toward the second end 211b after being drawn out from the second portion 211d. In an example, a first distance d1 between the first portion 211c in which the first flexible substrate 410 is connected to the sensor substrate 210 and the first axis A1 may be greater than a second distance d2 between the second portion 211d in which the second flexible substrate 420 is connected to the sensor substrate 210 and the first axis A1. The first distance d1 and the second distance d2 may be defined by the shortest distance between the central point P1 of the first portion 211c and the first axis A1, and the shortest distance between the central point P2 of the second portion 211d and the first axis A1, respectively.

In an example, a third distance d3 between the first portion 211c in which the first flexible substrate 410 is connected to the sensor substrate 210 and the second axis A2 may be less than a fourth distance d4 between the second portion 211d in which the second flexible substrate 420 is connected to the sensor substrate 210 and the second axis A2. The third distance d3 and the fourth distance d4 may be defined by the shortest distance between the central point P1 of the first portion 211c and the second axis A2, and the shortest distance between the central point P2 of the second portion 211d and the second axis A2, respectively.

In an example, the first distance d1 may be greater than the third distance d3, and the second distance d2 may be less than the fourth distance d4.

In an example embodiment, the first flexible substrate 410 and the second flexible substrate 420 may be connected to a portion of the inner edge 310 of the main substrate 300. The first flexible substrate 410 may be connected to the third portion 311a of the first inner edge 311, and the second flexible substrate 420 may be connected to the fourth portion 311b of the first inner edge 311.

In an example, the third portion 311a and the fourth portion 311b may be disposed in different positions when viewed from a direction parallel to the optical axis O. For example, the first flexible substrate 410 may extend in the +X direction along the second edge 212 until approaching the central line CL, and the second flexible substrate 420 may extend in the −X direction along the second edge 212 until approaching the central line CL. In this case, the first flexible substrate 410 and the second flexible substrate 420 may not overlap each other in the region between the first edge 211 and the first inner edge 311.

For example, a fifth distance d5 between the third portion 311a and the first axis A1 may be greater than a sixth distance d6 between the fourth portion 311b and the first axis A1. Alternatively, a seventh distance d7 between the third portion 311a and the second axis A2 may be less than an eighth distance d8 between the fourth portion 311b and the second axis A2.

In an example, the first flexible substrate 410 and the second flexible substrate 420 may be disposed symmetrically. The central line CL may divide the first axis A1 and the second axis A2 and may be parallel to the Y axis in the illustrated example embodiment. Referring to FIG. 4, the first flexible substrate 410 and the second flexible substrate 420 may be disposed symmetrically with respect to the central line CL parallel to the Y-axis.

Figure 9:
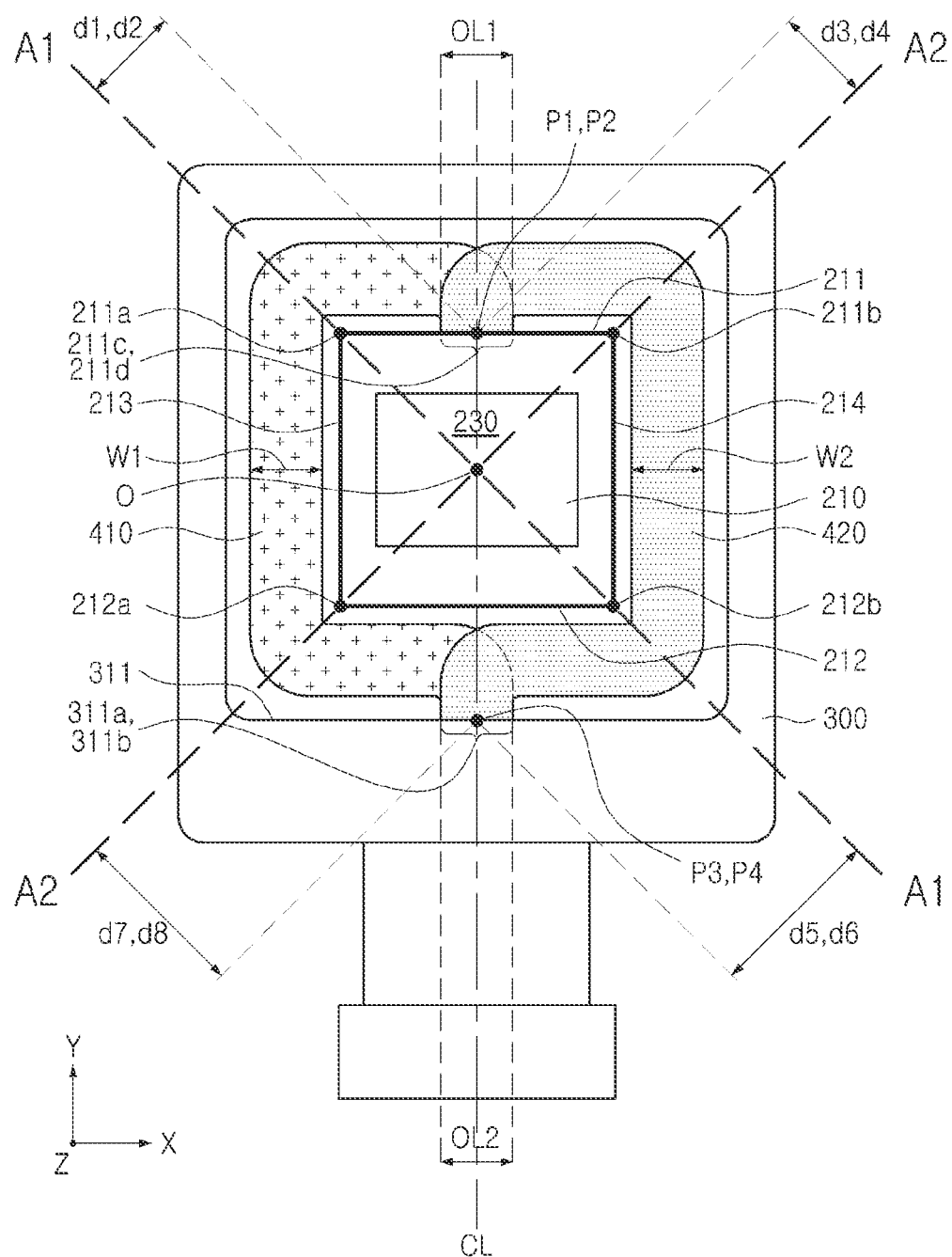
FIG. 9 is a diagram illustrating a connection structure between a sensor substrate and a main substrate, according to an embodiment.

FIG. 9 is a diagram illustrating a connection structure between the sensor substrate 400 and the main substrate 300, according to an embodiment.

In an example, the first flexible substrate 410 and the second flexible substrate 420 may be disposed along the edges 211, 212, 213, and 214 of a sensor substrate 210. In an example, the first flexible substrate 410 and the second flexible substrate 420 may be disposed to at least partially overlap each other. The first flexible substrate 410 and the second flexible substrate 420 may extend in a direction perpendicular to the optical axis O along the edges 211, 212, 213, and 214 of the sensor substrate 210, and may at least partially overlap each other in a direction perpendicular to the optical axis O. In other words, when the flexible substrate 400 is viewed in a direction parallel to the optical axis O, a portion of the first flexible substrate 410 may not be visible due to the second flexible substrate 420.

In an example, the first flexible substrate 410 and the second flexible substrate 420 may detour the sensor substrate 210 in opposite directions and may be connected to the main substrate 300. In an example, the first flexible substrate 410 may detour the sensor substrate 210 in a counterclockwise direction with respect to the optical axis O, and the second flexible substrate 420 may detour the sensor substrate 210 in a clockwise direction with respect to the optical axis O.

For example, the first flexible substrate 410 may extend in the −X direction along a portion of the first edge 211, may extend in the −Y direction along the third edge 213, may extend in the +X direction along a portion of the second edge 212, and may be connected to the inner edge 310 of the main substrate 300. The second flexible substrate 420 may extend in the +X direction along a portion of the first edge 211, may extend in the −Y direction along the fourth edge 214, may extend in the −X direction along a portion of the second edge 212, and may be connected to the inner edge 310 of the main substrate 300.

In an example, the first flexible substrate 410 and the second flexible substrate 420 may be drawn out from the same portion of the first edge 211. That is, when the sensor substrate 210 is viewed from the optical axis O, the portion to which the first flexible substrate 410 is connected may coincide with the portion to which the second flexible substrate 420 is connected. For example, the first flexible substrate 410 may extend from the first portion 211c of the first edge 211 in the +Y direction, the second flexible substrate 420 may extend from the second portion 211d of the first edge 211 in the +Y direction, and the first portion 211c may coincide with the second portion 211d. The first flexible substrate 410 and the second flexible substrate 420 may extend in opposite directions on the first edge 211. For example, the first flexible substrate 410 may be drawn out from the first portion 211c and may extend in the −X direction, and the second flexible substrate 420 may be drawn out from the second portion 211d and may extend in the +X direction.

In an example, the first flexible substrate 410 and the second flexible substrate 420 may at least partially overlap each other on the first edge 211. For example, the first flexible substrate 410 and the second flexible substrate 420 may be drawn out from the same portion of the first edge 211 of the sensor substrate 210 and may overlap each other in the region extending in the +Y direction.

In an example embodiment, the flexible substrate 400 may detour the sensor substrate 210 and may be connected to the main substrate 300. In an example embodiment, the flexible substrate 400 may be drawn out from the first edge 211 of the sensor substrate 210, and may extend to the second edge 212 opposing the first edge 211. The portion of the flexible substrate 400 extending to the second edge 212 may be connected to a portion of the first inner edge 311 opposing the second edge 212 of the inner edge 310 of the main substrate 300.

Referring back to FIG. 3, in an example, the optical assembly 200 may rotate about the first axis A1 and the second axis A2 perpendicular to the optical axis O with respect to the housing 100. Since the sensor substrate 210 is fastened to the optical assembly 200, and the main substrate 300 is fastened to the housing 100, the sensor substrate 210 may rotate about the first axis A1 and the second axis A2 with respect to the main substrate 300.

Referring to FIG. 9, in an example, the first edge 211 may extend from the first end 211a to the second end 211b in the +X direction, and the second edge 212 may extend from the third end 212a to the fourth end 212b in the +X direction while opposing the first edge 211. In this case, the first axis A1 may correspond to a diagonal from the first end 211a to the fourth end 212b, and the second axis A2 may correspond to a diagonal from the second end 211b to the third end 212a. Alternatively, the first axis A1 may correspond to the first diagonal 231 of the image sensor 230, and the second axis A2 may correspond to the second diagonal 232 of the image sensor 230.

The first flexible substrate 410 and the second flexible substrate 420 may at least partially overlap each other around the first edge 211.

The first flexible substrate 410 may detour the sensor substrate 210 in a direction (counterclockwise direction) toward the first end 211a after being drawn out from the first portion 211c. The second flexible substrate 420 may detour the sensor substrate 210 in a direction (clockwise direction) toward the second end 211b after being drawn out from the second portion 211d. In an example, a first distance d1 between the first portion 211c in which the first flexible substrate 410 is connected to the sensor substrate 210 and the first axis A1 may coincide with a second distance d2 between the second portion 211d in which the second flexible substrate 420 is connected to the sensor substrate 210 and the first axis A1. The first distance d1 and the second distance d2 may be defined by the shortest distance between the central point P1 of the first portion 211c and the first axis A1, and the shortest distance between the central point P2 of the second portion 211d and the first axis A1, respectively.

In an example, a third distance d3 between the first portion 211c in which the first flexible substrate 410 is connected to the sensor substrate 210 and the second axis A2 may coincide with a fourth distance d4 between the second portion 211d in which the second flexible substrate 420 is connected to the sensor substrate 210 and the second axis A2. The third distance d3 and the fourth distance d4 may be defined by the shortest distance between the central point P1 of the first portion 211c and the second axis A2, and the shortest distance between the central point P2 of the second portion 211d and the second axis A2, respectively.

In an example, the first distance d1 may coincide with the third distance d3, and the second distance d2 may coincide with the fourth distance d4.

In an example, the first flexible substrate 410 and the second flexible substrate 420 may be connected to a portion of the inner edge 310 of the main substrate 300. The first flexible substrate 410 may be connected to the third portion 311a of the first inner edge 311, and the second flexible substrate 420 may be connected to the fourth portion 311b of the first inner edge 311.

In an example, the first portion 211c and the second portion 211d may be disposed in the same position when viewed from a direction parallel to the optical axis O. For example, a fifth distance d5 between the third portion 311a and the first axis A1 may coincide with a sixth distance d6 between the fourth portion 311b and the first axis A1. Alternatively, a seventh distance d7 between the third portion 311a and the second axis A2 may coincide with an eighth distance d8 between the fourth portion 311b and the second axis A2. Accordingly, the first flexible substrate 410 and the second flexible substrate 420 may overlap each other in the region OL2 extending from the second edge 212 of the sensor substrate 210 to the first inner edge 311 of the main substrate 300.

In an example embodiment, the first flexible substrate 410 and the second flexible substrate 420 may be disposed symmetrically. The central line CL may divide the first axis A1 and the second axis A2 and may be parallel to the Y axis in the illustrated example. Referring to FIG. 4, the first flexible substrate 410 and the second flexible substrate 420 may be disposed symmetrically with respect to the central line CL parallel to the Y-axis.

Figure 10:
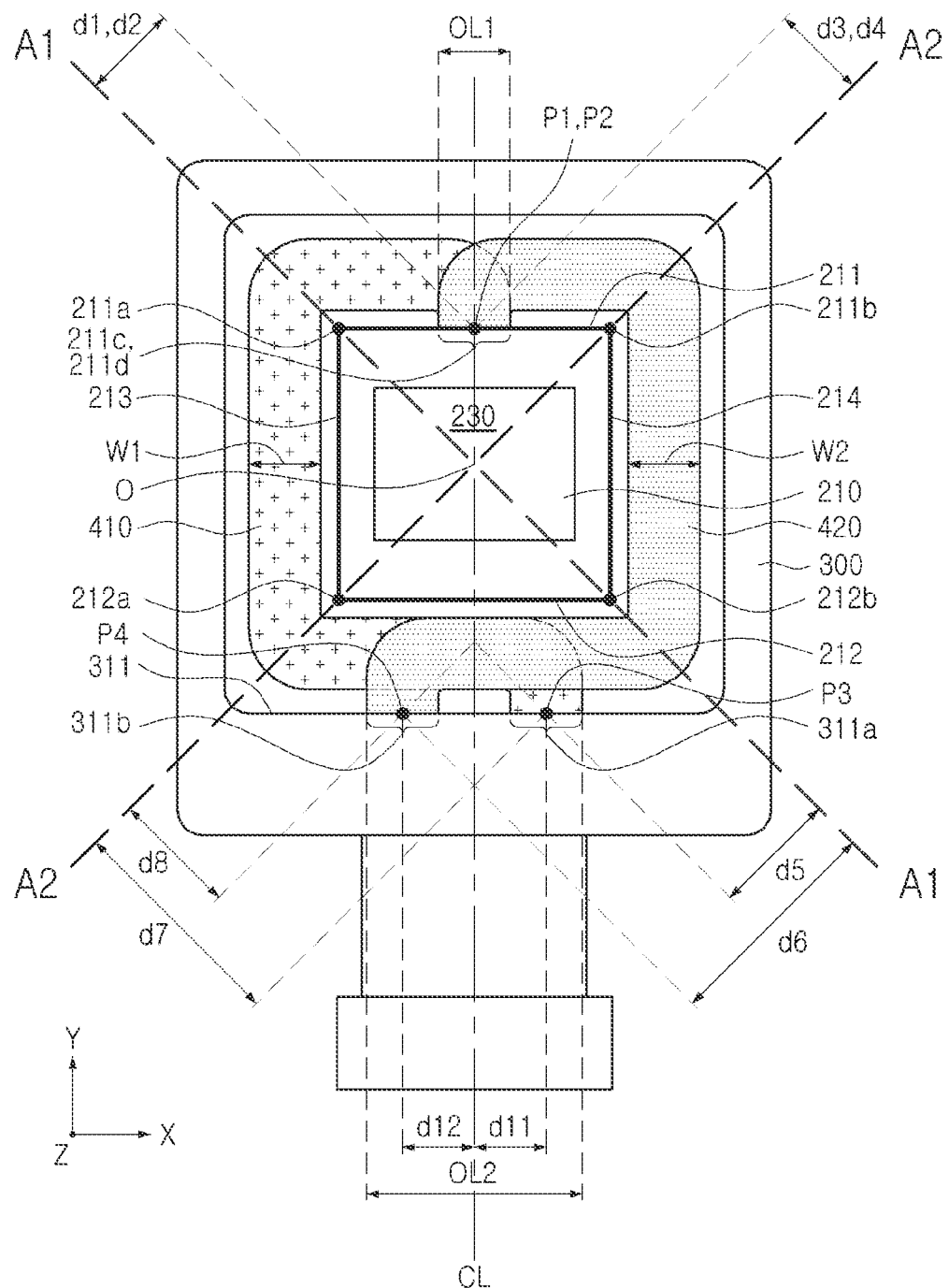
FIG. 10 is a diagram illustrating a connection structure between a sensor substrate and a main substrate, according to an embodiment.

FIG. 10 is a diagram illustrating a connection structure between the sensor substrate 210 and the main substrate 300, according to an embodiment.

In an example embodiment, the first flexible substrate 410 and the second flexible substrate 420 may be disposed along the edges 211, 212, 213, and 214 of a sensor substrate 210. In an example embodiment, the first flexible substrate 410 and the second flexible substrate 420 may be disposed to at least partially overlap each other. The first flexible substrate 410 and the second flexible substrate 420 may extend in a direction perpendicular to the optical axis O along the edges 211, 212, 213, and 214 of the sensor substrate 210, and may at least partially overlap each other in a direction perpendicular to the optical axis O. In other words, when the flexible substrate 400 is viewed in a direction parallel to the optical axis O, a portion of the first flexible substrate 410 may not be visible due to the second flexible substrate 420.

In an example, the first flexible substrate 410 and the second flexible substrate 420 may detour the sensor substrate 210 in opposite directions and may be connected to the main substrate 300. In an example embodiment, the first flexible substrate 410 may detour the sensor substrate 210 in a counterclockwise direction with respect to the optical axis O, and the second flexible substrate 420 may detour the sensor substrate 210 in a clockwise direction with respect to the optical axis O.

For example, the first flexible substrate 410 may extend in the −X direction along a portion of the first edge 211, may extend in the −Y direction along the third edge 213, may extend in the +X direction along a portion of the second edge 212, and may be connected to the inner edge 310 of the main substrate 300. The second flexible substrate 420 may extend in the +X direction along a portion of the first edge 211, may extend in the −Y direction along the fourth edge 214, may extend in the −X direction along a portion of the second edge 212, and may be connected to the inner edge 310 of the main substrate 300.

In an example, the first flexible substrate 410 and the second flexible substrate 420 may be drawn out from the same portion of the first edge 211. For example, the first flexible substrate 410 may extend from the first portion 211c of the first edge 211 in the +Y direction, the second flexible substrate 420 may extend from the second portion 211d of the first edge 211 in the +Y direction, and the first portion 211c may coincide with the second portion 211d. The first flexible substrate 410 and the second flexible substrate 420 may extend in opposite directions on the first edge 211. For example, the first flexible substrate 410 may be drawn out from the first portion 211c and may extend in the −X direction, and the second flexible substrate 420 may be drawn out from the second portion 211d and may extend in the +X direction.

In an example, the first flexible substrate 410 and the second flexible substrate 420 may at least partially overlap each other on the first edge 211. For example, the first flexible substrate 410 and the second flexible substrate 420 may be drawn out from the same portion of the first edge 211 of the sensor substrate 210 and may overlap each other in the region extending in the +Y direction.

In an example, the flexible substrate 400 may detour the sensor substrate 210 and may be connected to the main substrate 300. In an example embodiment, the flexible substrate 400 may be drawn out from the first edge 211 of the sensor substrate 210, and may extend to the second edge 212 opposing the first edge 211. The portion of the flexible substrate 400 extending to the second edge 212 may be connected to a portion of the first inner edge 311 opposing the second edge 212 of the inner edge 310 of the main substrate 300.

Referring back to FIG. 3, in an example, the optical assembly 200 may rotate about the first axis A1 and the second axis A2 perpendicular to the optical axis O with respect to the housing 100. Since the sensor substrate 210 is fastened to the optical assembly 200, and the main substrate 300 is fastened to the housing 100, the sensor substrate 210 may rotate about the first axis A1 and the second axis A2 with respect to the main substrate 300.

Referring to FIG. 10, in an example embodiment, the first edge 211 may extend from the first end 211a to the second end 211b in the +X direction, and the second edge 212 may extend from the third end 212a to the fourth end 212b in the +X direction while opposing the first edge 211. In this case, the first axis A1 may correspond to a diagonal from the first end 211a to the fourth end 212b, and the second axis A2 may correspond to a diagonal from the second end 211b to the third end 212a. Alternatively, the first axis A1 may correspond to the first diagonal 231 of the image sensor 230, and the second axis A2 may correspond to the second diagonal 232 of the image sensor 230.

The first flexible substrate 410 and the second flexible substrate 420 may at least partially overlap each other around the first edge 211.

The first flexible substrate 410 may detour the sensor substrate 210 in a direction (counterclockwise direction) toward the first end 211a after being drawn out from the first portion 211c. The second flexible substrate 420 may detour the sensor substrate 210 in a direction (clockwise direction) toward the second end 211b after being drawn out from the second portion 211d. In an example, a first distance d1 between the first portion 211c in which the first flexible substrate 410 is connected to the sensor substrate 210 and the first axis A1 may coincide with a second distance d2 between the second portion 211d in which the second flexible substrate 420 is connected to the sensor substrate 210 and the first axis A1. The first distance d1 and the second distance d2 may be defined by the shortest distance between the central point P1 of the first portion 211c and the first axis A1, and the shortest distance between the central point P2 of the second portion 211d and the first axis A1, respectively.

In an example embodiment, a third distance d3 between the first portion 211c in which the first flexible substrate 410 is connected to the sensor substrate 210 and the second axis A2 may coincide with a fourth distance d4 between the second portion 211d in which the second flexible substrate 420 is connected to the sensor substrate 210 and the second axis A2. The third distance d3 and the fourth distance d4 may be defined by the shortest distance between the central point P1 of the first portion 211c and the second axis A2, and the shortest distance between the central point P2 of the second portion 211d and the second axis A2, respectively.

In an example, the first distance d1 may coincide with the third distance d3, and the second distance d2 may coincide with the fourth distance d4.

In an example, the first flexible substrate 410 and the second flexible substrate 420 may be connected to a portion of the inner edge 310 of the main substrate 300. The first flexible substrate 410 may be connected to the third portion 311a of the first inner edge 311, and the second flexible substrate 420 may be connected to the fourth portion 311b of the first inner edge 311.

In an example, the third portion 311a and the fourth portion 311b may be disposed in different positions when viewed from a direction parallel to the optical axis O. For example, the first flexible substrate 410 may extend beyond the central line CL in the +X direction along the second edge 212, and the second flexible substrate 420 may extend beyond the central line CL in the −X direction along the second edge 212. In this case, the first flexible substrate 410 and the second flexible substrate 420 may overlap each other in the region OL2 between the third portion 311a and the fourth portion 311b. In the illustrated example embodiment, the second flexible substrate 420 may be disposed on the first flexible substrate 410, and in another example embodiment, the second flexible substrate 420 may be disposed on the second flexible substrate 420.

For example, a fifth distance d5 between the third portion 311a and the first axis A1 may be less than a sixth distance d6 between the fourth portion 311b and the first axis A1. Alternatively, a seventh distance d7 between the third portion 311a and the second axis A2 may be greater than an eighth distance d8 between the fourth portion 311b and the second axis A2.

In an example, the first flexible substrate 410 and the second flexible substrate 420 may be disposed symmetrically. The central line CL may divide the first axis A1 and the second axis A2 and may be parallel to the Y axis in the illustrated example. Referring to FIG. 4, the first flexible substrate 410 and the second flexible substrate 420 may be disposed symmetrically with respect to the central line CL parallel to the Y-axis.

Figure 11:
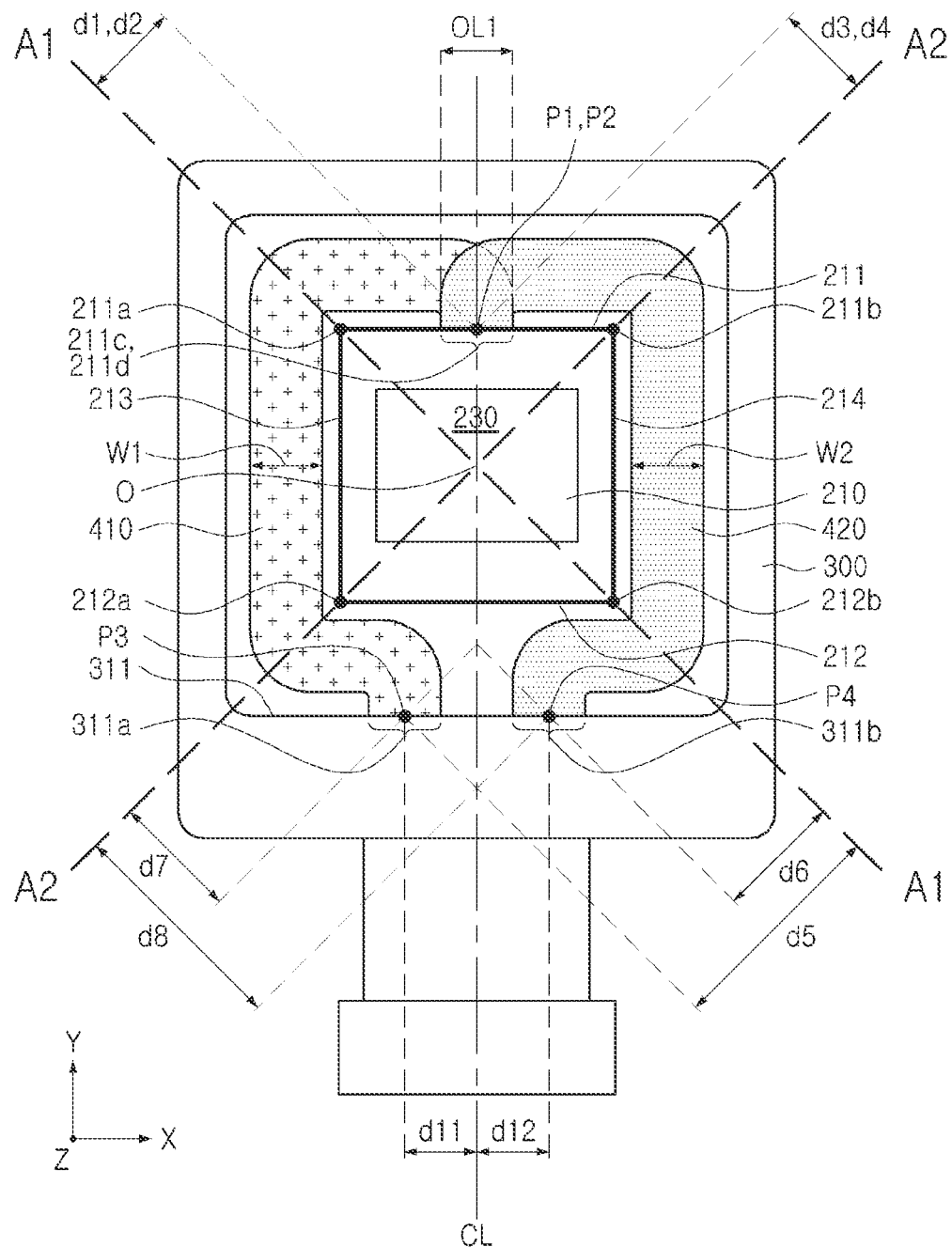
FIG. 11 is a diagram illustrating a connection structure between a sensor substrate and a main substrate, according to an embodiment.

FIG. 11 is a diagram illustrating a connection structure between the sensor substrate 210 and the main substrate 300, according to an embodiment.

In an example, the first flexible substrate 410 and the second flexible substrate 420 may be disposed along edges 211, 212, 213, and 214 of a sensor substrate 210. In an example, the first flexible substrate 410 and the second flexible substrate 420 may be disposed to at least partially overlap each other. The first flexible substrate 410 and the second flexible substrate 420 may extend in a direction perpendicular to the optical axis O along the edges 211, 212, 213, and 214 of the sensor substrate 210, and may at least partially overlap each other in a direction perpendicular to the optical axis O. In other words, when the flexible substrate 400 is viewed in a direction parallel to the optical axis O, a portion of the first flexible substrate 410 may not be visible due to the second flexible substrate 420.

In an example, the first flexible substrate 410 and the second flexible substrate 420 may detour the sensor substrate 210 in opposite directions and may be connected to the main substrate 300. In an example, the first flexible substrate 410 may detour the sensor substrate 210 in a counterclockwise direction with respect to the optical axis O, and the second flexible substrate 420 may detour the sensor substrate 210 in a clockwise direction with respect to the optical axis O.

For example, the first flexible substrate 410 may extend in the −X direction along a portion of the first edge 211, may extend in the −Y direction along the third edge 213, may extend in the +X direction along a portion of the second edge 212, and may be connected to the inner edge 310 of the main substrate 300. The second flexible substrate 420 may extend in the +X direction along a portion of the first edge 211, may extend in the −Y direction along the fourth edge 214, may extend in the −X direction along a portion of the second edge 212, and may be connected to the inner edge 310 of the main substrate 300.

In an example, the first flexible substrate 410 and the second flexible substrate 420 may be drawn out from the same portion of the first edge 211. For example, the first flexible substrate 410 may extend from the first portion 211c of the first edge 211 in the +Y direction, the second flexible substrate 420 may extend from the second portion 211d of the first edge 211 in the +Y direction, and the first portion 211c may coincide with the second portion 211d. The first flexible substrate 410 and the second flexible substrate 420 may extend in opposite directions on the first edge 211. For example, the first flexible substrate 410 may be drawn out from the first portion 211c and may extend in the −X direction, and the second flexible substrate 420 may be drawn out from the second portion 211d and may extend in the +X direction.

In an example embodiment, the first flexible substrate 410 and the second flexible substrate 420 may at least partially overlap each other on the first edge 211. For example, the first flexible substrate 410 and the second flexible substrate 420 may be drawn out from the same portion of the first edge 211 of the sensor substrate 210 and may overlap each other in the region extending in the +Y direction.

In an example, the flexible substrate 400 may detour the sensor substrate 210 and may be connected to the main substrate 300. In an example, the flexible substrate 400 may be drawn out from the first edge 211 of the sensor substrate 210, and may extend to the second edge 212 opposing the first edge 211. The portion of the flexible substrate 400 extending to the second edge 212 may be connected to a portion of the first inner edge 311 opposing the second edge 212 of the inner edge 310 of the main substrate 300.

Referring back to FIG. 3, in an example embodiment, the optical assembly 200 may rotate about the first axis A1 and the second axis A2 perpendicular to the optical axis O with respect to the housing 100. Since the sensor substrate 210 is fastened to the optical assembly 200, and the main substrate 300 is fastened to the housing 100, the sensor substrate 210 may rotate about the first axis A1 and the second axis A2 with respect to the main substrate 300.

Referring to FIG. 11, in an example, the first edge 211 may extend from the first end 211a to the second end 211b in the +X direction, and the second edge 212 may extend from the third end 212a to the fourth end 212b in the +X direction while opposing the first edge 211. In this case, the first axis A1 may correspond to a diagonal from the first end 211a to the fourth end 212b, and the second axis A2 may correspond to a diagonal from the second end 211b to the third end 212a. The first flexible substrate 410 and the second flexible substrate 420 may at least partially overlap each other around the first edge 211.

The first flexible substrate 410 may detour the sensor substrate 210 in a direction (counterclockwise direction) toward the first end 211a after being drawn out from the first portion 211c. The second flexible substrate 420 may detour the sensor substrate 210 in a direction (clockwise direction) toward the second end 211b after being drawn out from the second portion 211d. In an example, a first distance d1 between the first portion 211c in which the first flexible substrate 410 is connected to the sensor substrate 210 and the first axis A1 may coincide with a second distance d2 between the second portion 211d in which the second flexible substrate 420 is connected to the sensor substrate 210 and the first axis A1. The first distance d1 and the second distance d2 may be defined by the shortest distance between the central point P1 of the first portion 211c and the first axis A1, and the shortest distance between the central point P2 of the second portion 211d and the first axis A1, respectively.

In an example, a third distance d3 between the first portion 211c in which the first flexible substrate 410 is connected to the sensor substrate 210 and the second axis A2 may coincide with a fourth distance d4 between the second portion 211d in which the second flexible substrate 420 is connected to the sensor substrate 210 and the second axis A2. The third distance d3 and the fourth distance d4 may be defined by the shortest distance between the central point P1 of the first portion 211c and the second axis A2, and the shortest distance between the central point P2 of the second portion 211d and the second axis A2, respectively.

In an example, the first distance d1 may coincide with the third distance d3, and the second distance d2 may coincide with the fourth distance d4.

In an example, the first flexible substrate 410 and the second flexible substrate 420 may be connected to a portion of the inner edge 310 of the main substrate 300. The first flexible substrate 410 may be connected to the third portion 311a of the first inner edge 311, and the second flexible substrate 420 may be connected to the fourth portion 311b of the first inner edge 311.

In an example embodiment, the third portion 311a and the fourth portion 311b may be disposed in different positions when viewed from a direction parallel to the optical axis O. For example, the first flexible substrate 410 may extend in the +X direction along the second edge 212 until approaching the central line CL, and the second flexible substrate 420 may extend in the −X direction along the second edge 212 until approaching the central line CL. In this case, the first flexible substrate 410 and the second flexible substrate 420 may not overlap each other in the region between the first edge 211 and the first inner edge 311.

For example, a fifth distance d5 between the third portion 311a and the first axis A1 may be greater than a sixth distance d6 between the fourth portion 311b and the first axis A1. Alternatively, a seventh distance d7 between the third portion 311a and the second axis A2 may be less than an eighth distance d8 between the fourth portion 311b and the second axis A2.

Figure 12:
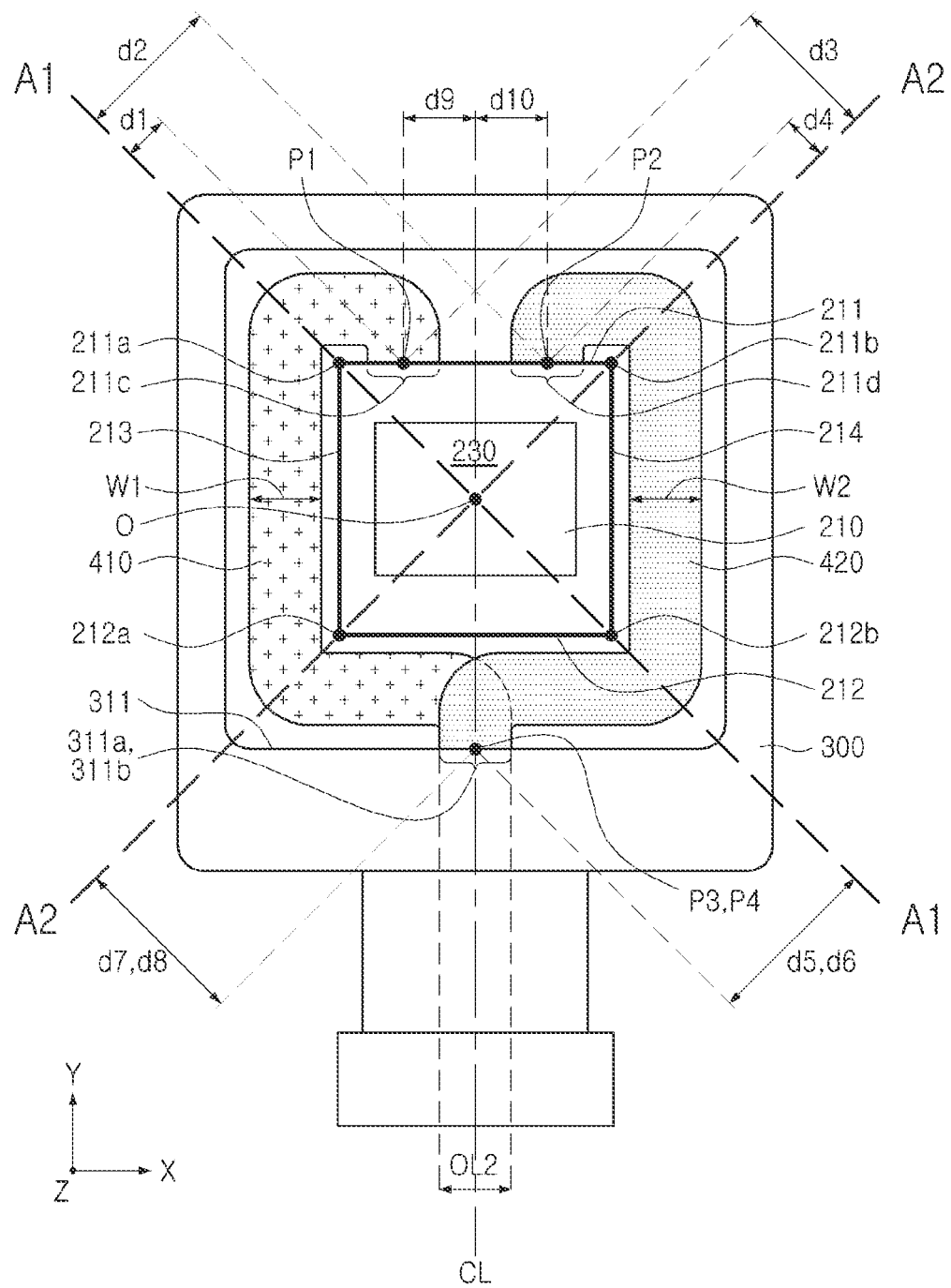
FIG. 12 is a diagram illustrating a connection structure between a sensor substrate and a main substrate, according to an embodiment.

FIG. 12 is a diagram illustrating a connection structure between the sensor substrate 210 and the main substrate 300, according to an embodiment.

In an example, the first flexible substrate 410 and the second flexible substrate 420 may be disposed along the edges 211, 212, 213, and 214 of a sensor substrate 210. In an example, the first flexible substrate 410 and the second flexible substrate 420 may detour the sensor substrate 210 in opposite directions and may be connected to the main substrate 300. In an example embodiment, the first flexible substrate 410 may detour the sensor substrate 210 in a counterclockwise direction with respect to the optical axis O, and the second flexible substrate 420 may detour the sensor substrate 210 in a clockwise direction with respect to the optical axis O.

For example, the first flexible substrate 410 may extend in the −X direction along a portion of the first edge 211, may extend in the −Y direction along the third edge 213, may extend in the +X direction along a portion of the second edge 212, and may be connected to the inner edge 310 of the main substrate 300. The second flexible substrate 420 may extend in the +X direction along a portion of the first edge 211, may extend in the −Y direction along the fourth edge 214, may extend in the −X direction along a portion of the second edge 212, and may be connected to the inner edge 310 of the main substrate 300.

In an example, the first flexible substrate 410 and the second flexible substrate 420 may be drawn out from different portions of the first edge 211. For example, the first flexible substrate 410 may extend from the first portion 211c of the first edge 211 in the +Y direction, and the second flexible substrate 420 may extend from the second portion 211d of the first edge 211 in the +Y direction. The first flexible substrate 410 and the second flexible substrate 420 may extend in opposite directions on the first edge 211. For example, the first flexible substrate 410 may extend in the −X direction after being drawn out from the first portion 211c, and the second flexible substrate 420 may extend in the +X direction after being drawn out from the second portion 211d.

In an example, the flexible substrate 400 may detour the sensor substrate 210 and may be connected to the main substrate 300. In an example embodiment, the flexible substrate 400 may be drawn out from the first edge 211 of the sensor substrate 210, and may extend to the second edge 212 opposing the first edge 211. The portion of the flexible substrate 400 extending to the second edge 212 may be connected to a portion of the first inner edge 311 opposing the second edge 212 of the inner edge 310 of the main substrate 300.

Referring back to FIG. 3, in an example, the optical assembly 200 may rotate about the first axis A1 and the second axis A2 perpendicular to the optical axis O with respect to the housing 100. Since the sensor substrate 210 is fastened to the optical assembly 200, and the main substrate 300 is fastened to the housing 100, the sensor substrate 210 may rotate about the first axis A1 and the second axis A2 with respect to the main substrate 300.

Referring to FIG. 12, in an example, the first edge 211 may extend from the first end 211a to the second end 211b in the +X direction, and the second edge 212 may extend from the third end 212a to the fourth end 212b in the +X direction while opposing the first edge 211. In this case, the first axis A1 may correspond to a diagonal from the first end 211a to the fourth end 212b, and the second axis A2 may correspond to a diagonal from the second end 211b to the third end 212a. Alternatively, the first axis A1 may correspond to the first diagonal 231 of the image sensor 230, and the second axis A2 may correspond to the second diagonal 232 of the image sensor 230.

The first flexible substrate 410 may detour the sensor substrate 210 in a direction (counterclockwise direction) toward the first end 211a after being drawn out from the first portion 211c. The second flexible substrate 420 may detour the sensor substrate 210 in a direction (clockwise direction) toward the second end 211b after being drawn out from the second portion 211d. In an example, a first distance d1 between the first portion 211c in which the first flexible substrate 410 is connected to the sensor substrate 210 and the first axis A1 may be less than a second distance d2 between the second portion 211d in which the second flexible substrate 420 is connected to the sensor substrate 210 and the first axis A1. The first distance d1 and the second distance d2 may be defined by the by the shortest distance between the central point P1 of the first portion 211c and the first axis A1, and the shortest distance between the central point P2 of the second portion 211d and the first axis A1, respectively.

In an example, a third distance d3 between the first portion 211c in which the first flexible substrate 410 is connected to the sensor substrate 210 and the second axis A2 may be greater than a fourth distance d4 between the second portion 211d in which the second flexible substrate 420 is connected to the sensor substrate 210 and the second axis A2. The third distance d3 and the fourth distance d4 may be defined by the shortest distance between the central point P1 of the first portion 211c and the second axis A2, and the shortest distance between the central point P2 of the second portion 211d and the second axis A2, respectively.

In an example, the first distance d1 may be less than the third distance d3, and the second distance d2 may be greater than the fourth distance d4.

In an example, the first flexible substrate 410 and the second flexible substrate 420 may be connected to a portion of the inner edge 310 of the main substrate 300. The first flexible substrate 410 may be connected to the third portion 311a of the first inner edge 311, and the second flexible substrate 420 may be connected to the fourth portion 311b of the first inner edge 311.

In an example, the first portion 211c and the second portion 211d may be disposed in the same position when viewed from a direction parallel to the optical axis O. For example, a fifth distance d5 between the third portion 311a and the first axis A1 may coincide with a sixth distance d6 between the fourth portion 311b and the first axis A1. Alternatively, a seventh distance d7 between the third portion 311a and the second axis A2 may coincide with an eighth distance d8 between the fourth portion 311b and the second axis A2. Accordingly, the first flexible substrate 410 and the second flexible substrate 420 may overlap each other in the region OL2 extending from the second edge 212 of the sensor substrate 210 to the first inner edge 311 of the main substrate 300.

In an example, the first flexible substrate 410 and the second flexible substrate 420 may be disposed symmetrically. The central line CL may divide the first axis A1 and the second axis A2 and may be parallel to the Y axis in the illustrated example. Referring to FIG. 4, the first flexible substrate 410 and the second flexible substrate 420 may be disposed symmetrically with respect to the central line CL parallel to the Y-axis.

Figure 13:
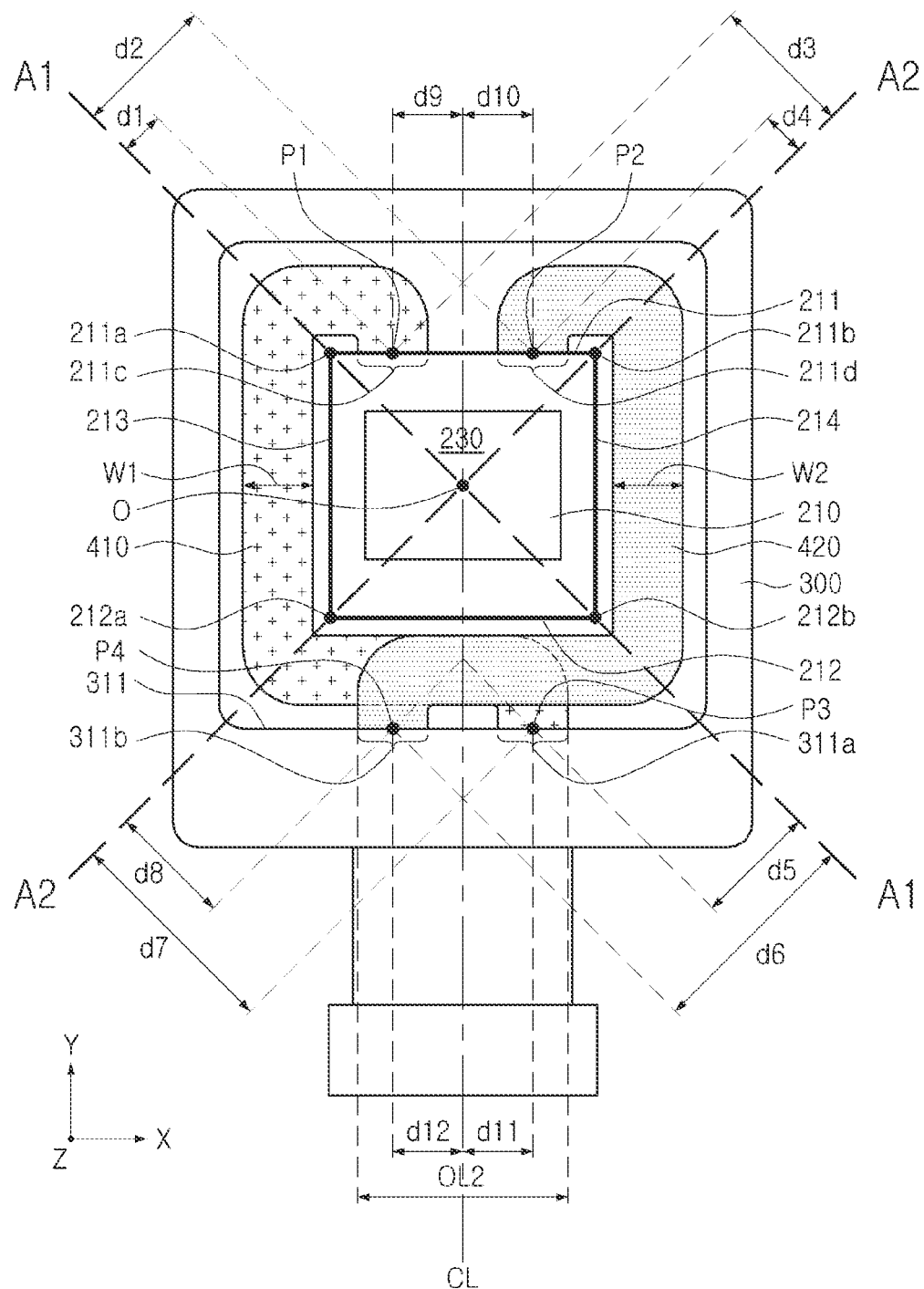
FIG. 13 is a diagram illustrating a connection structure between a sensor substrate and a main substrate, according to an embodiment.

FIG. 13 is a diagram illustrating a connection structure between the sensor substrate 210 and the main substrate 300, according to an embodiment.

In an example, the first flexible substrate 410 and the second flexible substrate 420 may be disposed along the edges 211, 212, 213, and 214 of a sensor substrate 210. In an example, the first flexible substrate 410 and the second flexible substrate 420 may detour the sensor substrate 210 in opposite directions and may be connected to the main substrate 300. In an embodiment, the first flexible substrate 410 may detour the sensor substrate 210 in a counterclockwise direction with respect to the optical axis O, and the second flexible substrate 420 may detour the sensor substrate 210 in a clockwise direction with respect to the optical axis O.

For example, the first flexible substrate 410 may extend in the −X direction along a portion of the first edge 211, may extend in the −Y direction along the third edge 213, may extend in the +X direction along a portion of the second edge 212, and may be connected to the inner edge 310 of the main substrate 300. The second flexible substrate 420 may extend in the +X direction along a portion of the first edge 211, may extend in the −Y direction along the fourth edge 214, may extend in the −X direction along a portion of the second edge 212, and may be connected to the inner edge 310 of the main substrate 300.

In an example, the first flexible substrate 410 and the second flexible substrate 420 may be drawn out from different portions of the first edge 211. For example, the first flexible substrate 410 may extend from the first portion 211c of the first edge 211 in the +Y direction, and the second flexible substrate 420 may extend from the second portion 211d of the first edge 211 in the +Y direction. The first flexible substrate 410 and the second flexible substrate 420 may extend in opposite directions on the first edge 211. For example, the first flexible substrate 410 may be drawn out from the first portion 211c and may extend in the −X direction, and the second flexible substrate 420 may be drawn out from the second portion 211d and may extend in the +X direction.

In an example embodiment, the flexible substrate 400 may detour the sensor substrate 210 and may be connected to the main substrate 300. In an example embodiment, the flexible substrate 400 may be drawn out from the first edge 211 of the sensor substrate 210, and may extend to the second edge 212 opposing the first edge 211. The portion of the flexible substrate 400 extending to the second edge 212 may be connected to a portion of the first inner edge 311 opposing the second edge 212 of the inner edge 310 of the main substrate 300.

Referring back to FIG. 3, in an example, the optical assembly 200 may rotate about the first axis A1 and the second axis A2 perpendicular to the optical axis O with respect to the housing 100. Since the sensor substrate 210 is fastened to the optical assembly 200, and the main substrate 300 is fastened to the housing 100, the sensor substrate 210 may rotate about the first axis A1 and the second axis A2 with respect to the main substrate 300.

Referring to FIG. 13, in an example, the first edge 211 may extend from the first end 211a to the second end 211b in the +X direction, and the second edge 212 may extend from the third end 212a to the fourth end 212b in the +X direction while opposing the first edge 211. In this case, the first axis A1 may correspond to a diagonal from the first end 211a to the fourth end 212b, and the second axis A2 may correspond to a diagonal from the second end 211b to the third end 212a. Alternatively, the first axis A1 may correspond to the first diagonal 231 of the image sensor 230, and the second axis A2 may correspond to the second diagonal 232 of the image sensor 230.

The first flexible substrate 410 may detour the sensor substrate 210 in a direction (counterclockwise direction) toward the first end 211a after being drawn out from the first portion 211c. The second flexible substrate 420 may detour the sensor substrate 210 in a direction (clockwise direction) toward the second end 211b after being drawn out from the second portion 211d. In an example, a first distance d1 between the first portion 211c in which the first flexible substrate 410 is connected to the sensor substrate 210 and the first axis A1 may be less than a second distance d2 between the second portion 211d in which the second flexible substrate 420 is connected to the sensor substrate 210 and the first axis A1. The first distance d1 and the second distance d2 may be defined by the by the shortest distance between the central point P1 of the first portion 211c and the first axis A1, and the shortest distance between the central point P2 of the second portion 211d and the first axis A1, respectively.

In an example, a third distance d3 between the first portion 211c in which the first flexible substrate 410 is connected to the sensor substrate 210 and the second axis A2 may be greater than a fourth distance d4 between the second portion 211d in which the second flexible substrate 420 is connected to the sensor substrate 210 and the second axis A2. The third distance d3 and the fourth distance d4 may be defined by the shortest distance between the central point P1 of the first portion 211c and the second axis A2, and the shortest distance between the central point P2 of the second portion 211d and the second axis A2, respectively.

In an example, the first distance d1 may be less than the third distance d3, and the second distance d2 may be greater than the fourth distance d4.

In an example, the first flexible substrate 410 and the second flexible substrate 420 may be connected to a portion of the inner edge 310 of the main substrate 300. The first flexible substrate 410 may be connected to the third portion 311a of the first inner edge 311, and the second flexible substrate 420 may be connected to the fourth portion 311b of the first inner edge 311.

In an example, the third portion 311a and the fourth portion 311b may be disposed in different positions when viewed from a direction parallel to the optical axis O. For example, the first flexible substrate 410 may extend beyond the central line CL in the +X direction along the second edge 212, and the second flexible substrate 420 may extend beyond the central line CL in the −X direction along the second edge 212. In this case, the first flexible substrate 410 and the second flexible substrate 420 may overlap each other in the region OL2 between the third portion 311*a* and the fourth portion 311*b*. In the illustrated example, the second flexible substrate 420 may be disposed on the first flexible substrate 410, and in another example, the second flexible substrate 420 may be disposed on the second flexible substrate 420.

For example, a fifth distance d5 between the third portion 311*a* and the first axis A1 may be less than a sixth distance d6 between the fourth portion 311*b* and the first axis A1. Alternatively, a seventh distance d7 between the third portion 311*a* and the second axis A2 may be greater than an eighth distance d8 between the fourth portion 311*b* and the second axis A2.

In an example, the first flexible substrate 410 and the second flexible substrate 420 may be disposed symmetrically. The central line CL may divide the first axis A1 and the second axis A2 and may be parallel to the Y axis in the illustrated example embodiment. Referring to FIG. 4, the first flexible substrate 410 and the second flexible substrate 420 may be disposed symmetrically with respect to the central line CL parallel to the Y-axis.

Figure 14:
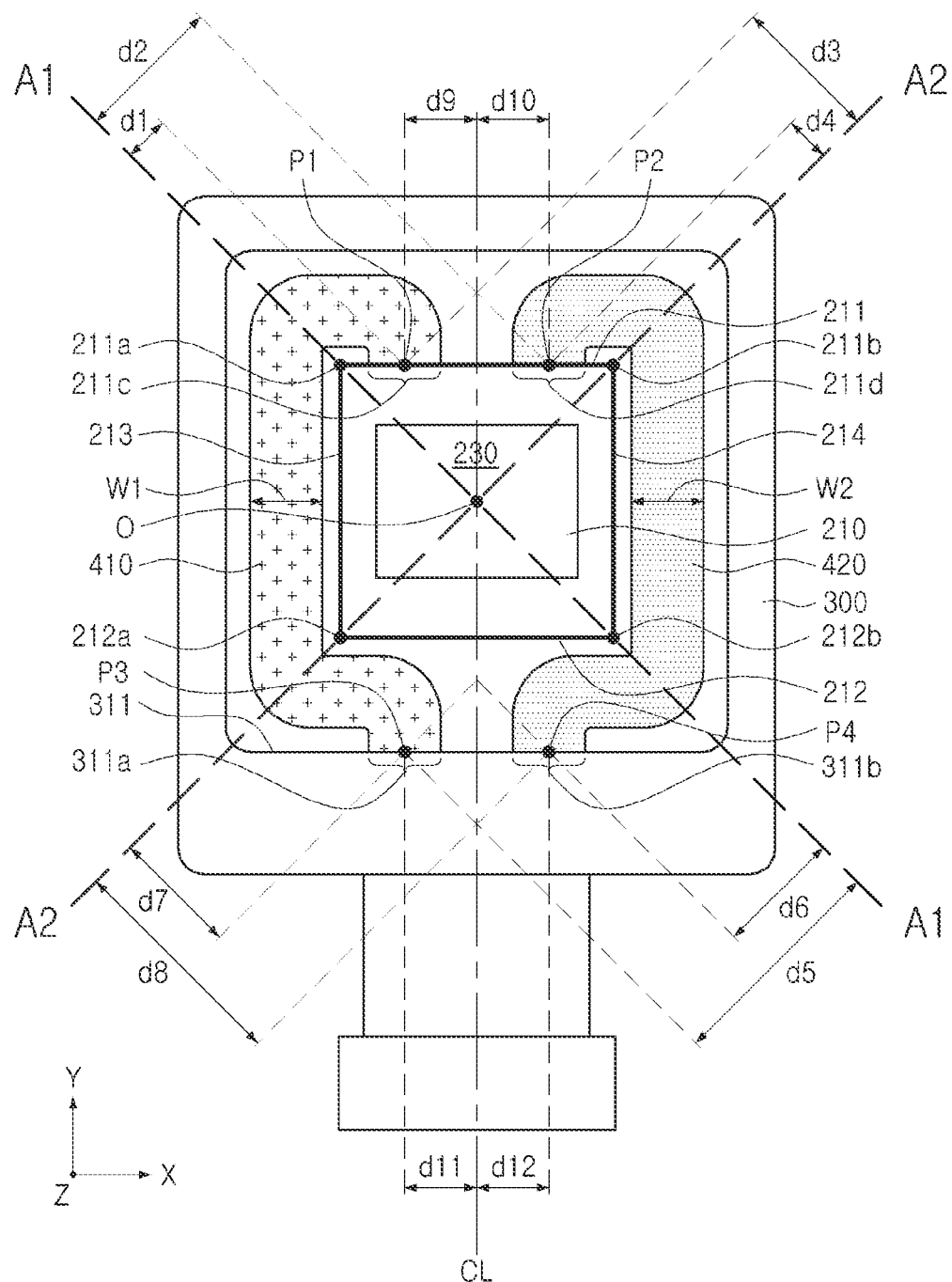
FIG. 14 is a diagram illustrating a connection structure between a sensor substrate and a main substrate, according to an embodiment.

FIG. 14 is a diagram illustrating a connection structure between the sensor substrate 210 and the main substrate 300, according to an embodiment.

In an example, a first flexible substrate 410 and a second flexible substrate 420 may be disposed along the edges 211, 212, 213, and 214 of a sensor substrate 210. In an example, the first flexible substrate 410 and the second flexible substrate 420 may detour the sensor substrate 210 in opposite directions and may be connected to the main substrate 300. In an example embodiment, the first flexible substrate 410 may detour the sensor substrate 210 in a counterclockwise direction with respect to the optical axis O, and the second flexible substrate 420 may detour the sensor substrate 210 in a clockwise direction with respect to the optical axis O.

For example, the first flexible substrate 410 may extend in the −X direction along a portion of the first edge 211, may extend in the −Y direction along the third edge 213, may extend in the +X direction along a portion of the second edge 212, and may be connected to the inner edge 310 of the main substrate 300. The second flexible substrate 420 may extend in the +X direction along a portion of the first edge 211, may extend in the −Y direction along the fourth edge 214, may extend in the −X direction along a portion of the second edge 212, and may be connected to the inner edge 310 of the main substrate 300.

In an example, the first flexible substrate 410 and the second flexible substrate 420 may be drawn out from different portions of the first edge 211. For example, the first flexible substrate 410 may extend from the first portion 211*c* of the first edge 211 in the +Y direction, and the second flexible substrate 420 may extend from the second portion 211*d* of the first edge 211 in the +Y direction. The first flexible substrate 410 and the second flexible substrate 420 may extend in opposite directions on the first edge 211. For example, the first flexible substrate 410 may be drawn out from the first portion 211*c* and may extend in the −X direction, and the second flexible substrate 420 may be drawn out from the second portion 211*d* and may extend in the +X direction.

In an example embodiment, the flexible substrate 400 may detour the sensor substrate 210 and may be connected to the main substrate 300. In an example embodiment, the flexible substrate 400 may be drawn out from the first edge 211 of the sensor substrate 210, and may extend to the second edge 212 opposing the first edge 211. The portion of the flexible substrate 400 extending to the second edge 212 may be connected to a portion of the first inner edge 311 opposing the second edge 212 of the inner edge 310 of the main substrate 300.

Referring back to FIG. 3, in an example, the optical assembly 200 may rotate about the first axis A1 and the second axis A2 perpendicular to the optical axis O with respect to the housing 100. Since the sensor substrate 210 is fastened to the optical assembly 200, and the main substrate 300 is fastened to the housing 100, the sensor substrate 210 may rotate about the first axis A1 and the second axis A2 with respect to the main substrate 300.

In an example, the first edge 211 may extend from the first end 211*a* to the second end 211*b* in the +X direction, and the second edge 212 may extend from the third end 212*a* to the fourth end 212*b* in the +X direction while opposing the first edge 211. In this case, the first axis A1 may correspond to a diagonal from the first end 211*a* to the fourth end 212*b*, and the second axis A2 may correspond to a diagonal from the second end 211*b* to the third end 212*a*. Alternatively, the first axis A1 may correspond to the first diagonal 231 of the image sensor 230, and the second axis A2 may correspond to the second diagonal 232 of the image sensor 230.

The first flexible substrate 410 may detour the sensor substrate 210 in a direction (counterclockwise direction) toward the first end 211*a* after being drawn out from the first portion 211*c*. The second flexible substrate 420 may detour the sensor substrate 210 in a direction (clockwise direction) toward the second end 211*b* after being drawn out from the second portion 211*d*. In an example, a first distance d1 between the first portion 211*c* in which the first flexible substrate 410 is connected to the sensor substrate 210 and the first axis A1 may be less than a second distance d2 between the second portion 211*d* in which the second flexible substrate 420 is connected to the sensor substrate 210 and the first axis A1. The first distance d1 and the second distance d2 may be defined by the shortest distance between the central point P1 of the first portion 211*c* and the first axis A1, and the shortest distance between the central point P2 of the second portion 211*d* and the first axis A1, respectively.

In an example, a third distance d3 between the first portion 211*c* in which the first flexible substrate 410 is connected to the sensor substrate 210 and the second axis A2 may be greater than a fourth distance d4 between the second portion 211*d* in which the second flexible substrate 420 is connected to the sensor substrate 210 and the second axis A2. The third distance d3 and the fourth distance d4 may be defined by the shortest distance between the central point P1 of the first portion 211*c* and the second axis A2, and the shortest distance between the central point P2 of the second portion 211*d* and the second axis A2, respectively.

In an example, the first distance d1 may be less than the third distance d3, and the second distance d2 may be greater than the fourth distance d4.

In an example, the first flexible substrate 410 and the second flexible substrate 420 may be connected to a portion of the inner edge 310 of the main substrate 300. The first flexible substrate 410 may be connected to the third portion 311*a* of the first inner edge 311, and the second flexible substrate 420 may be connected to the fourth portion 311*b* of the first inner edge 311.

In an example embodiment, the third portion 311a and the fourth portion 311b may be disposed in different positions when viewed from a direction parallel to the optical axis O. For example, the first flexible substrate 410 may extend in the +X direction along the second edge 212 until approaching the central line CL, and the second flexible substrate 420 may extend in the −X direction along the second edge 212 until approaching the central line CL. In this case, the first flexible substrate 410 and the second flexible substrate 420 may not overlap each other in the region between the first edge 211 and the first inner edge 311.

For example, a fifth distance d5 between the third portion 311a and the first axis A1 may be greater than a sixth distance d6 between the fourth portion 311b and the first axis A1. Alternatively, a seventh distance d7 between the third portion 311a and the second axis A2 may be less than an eighth distance d8 between the fourth portion 311b and the second axis A2.

In an example, the first flexible substrate 410 and the second flexible substrate 420 may be disposed symmetrically. The central line CL may divide the first axis A1 and the second axis A2 and may be parallel to the Y axis in the illustrated example embodiment. Referring to FIG. 4, the first flexible substrate 410 and the second flexible substrate 420 may be disposed symmetrically with respect to the central line CL parallel to the Y-axis.

According to the aforementioned embodiments, shaking may be easily controlled in an image obtained by imaging a stationary subject, and also in a video recording a subject. A camera module according to the embodiments disclosed herein may rotate by a relatively large angle such that a tracking function may be implemented in taking a video.

Also, when shaking is corrected by rotating the image sensor, an electrical wire for transmitting a signal of the image sensor may be configured to not interfere with rotation of the image sensor.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a housing;
    an optical assembly configured to tilt with respect to the housing, and including a lens system and a sensor substrate having an image sensor;
    a main substrate disposed in the housing and spaced apart from the sensor substrate; and
    a first flexible substrate and a second flexible substrate, different from each other, and configured to connect the sensor substrate to the main substrate,
    wherein the first flexible substrate and the second flexible substrate are disposed to at least partially overlap each other in an optical axis direction, and
    wherein the first flexible substrate and the second flexible substrate are formed to have respective shapes that are symmetrical to each other with respect to a center line dividing a first axis and a second axis.

2. The camera module of claim 1, wherein the first flexible substrate and the second flexible substrate extend along a portion of an edge of the sensor substrate.

3. The camera module of claim 2, wherein the first flexible substrate and the second flexible substrate extend outward from different portions of the edge of the sensor substrate, and include respective portions extending in opposite directions while overlapping each other.

4. The camera module of claim 3, wherein the edge of the sensor substrate includes a first edge extending in a first direction perpendicular to the optical axis,
    wherein a first portion of the first flexible substrate extends outward from a portion of the first edge and extends in the first direction, and
    wherein a portion of the second flexible substrate extends outward from another portion of the first edge and extends in a second direction opposite to the first direction, and overlaps at least a portion of the first portion of the first flexible substrate.

5. The camera module of claim 3, wherein the first flexible substrate extends around a perimeter of the sensor substrate in a counterclockwise direction with respect to the optical axis, and the second flexible substrate extends around the perimeter of the sensor substrate in a clockwise direction with respect to the optical axis.

6. The camera module of claim 3, wherein the edge of the sensor substrate includes a first edge and a second edge opposing each other, and
    wherein the first flexible substrate and the second flexible substrate extend outward from the first edge and are connected to an inner edge of the main substrate opposing the second edge.

7. The camera module of claim 6, wherein the first flexible substrate and the second flexible substrate are connected to a same portion of the inner edge of the main substrate.

8. The camera module of claim 1, further comprising:
    a first frame configured to tilt with respect to a first axis perpendicular to the optical axis in the housing; and
    a second frame configured to tilt with respect to a second axis perpendicular to the optical axis and intersecting the first axis, with respect to the first frame,
    wherein the optical assembly is coupled to the second frame and is configured to tilt with respect to the first axis and the second axis, with respect to the housing.

9. The camera module of claim 1, wherein an end of the first flexible substrate and an end of the second flexible substrate are respectively connected to the sensor substrate at portions of the sensor substrate that overlap each other in a view in an optical axis direction.

10. The camera module of claim 1, wherein an end of the first flexible substrate and an end of the second flexible substrate are respectively connected to the sensor substrate at portions of the sensor substrate that do not overlap each other in a view in an optical axis direction.

11. A camera module, comprising:
    a housing;
    an optical assembly configured to tilt with respect to the housing, and including a lens system and a sensor substrate having an image sensor;

a main substrate disposed in the housing and spaced apart from the sensor substrate; and
a first flexible substrate and a second flexible substrate configured to connect the sensor substrate to the main substrate,
wherein the optical assembly is configured to tilt with respect to a first axis and a second axis, with respect to the housing, and the first and second axes are perpendicular to the optical axis and intersect each other,
wherein the sensor substrate includes an edge including first and second edges opposing each other, the first edge extends from a first end to a second end in a first direction, and the second edge extends from a third end to a fourth end in the first direction,
wherein the first axis corresponds to a diagonal from the first end to the fourth end and the second axis corresponds to a diagonal from the second end to the third end, and
wherein the first flexible substrate and the second flexible substrate extend along the edge of the sensor substrate, and at least partially overlap each other in a region between the first end and the second end.

12. The camera module of claim 11,
wherein the first flexible substrate extends outward from a first portion of the first edge, and extends around a perimeter of the sensor substrate in a direction from the first portion to the first end,
wherein the second flexible substrate extends outward from a second portion of the first edge, and extends around the perimeter of the sensor substrate in a direction from the second portion to the second end, and
wherein a first distance between the first portion and the first axis is greater than a second distance between the second portion and the first axis, in a view in an optical axis direction.

13. The camera module of claim 12, wherein a third distance between the first portion and the second axis is equal to the second distance, and a fourth distance between the second portion and the second axis is equal to the first distance, in a view in the optical axis direction.

14. The camera module of claim 12, wherein a third portion connected to the first flexible substrate on an edge of the main substrate and a fourth portion connected to the second flexible substrate on an edge of the main substrate are disposed at a same distance from the first axis and the second axis.

15. The camera module of claim 11, wherein the first flexible substrate extends outward from a first portion of the first edge, and extends around a perimeter of the sensor substrate in a direction from the first portion to the first end,
wherein the second flexible substrate extends outward from a second portion of the first edge, and extends around the perimeter of the sensor substrate in a direction from the second portion to the second end, and
wherein a distance between the first portion and the first axis is greater than a distance between the first portion and the second axis, and a distance between the second portion and the first axis is less than a distance between the second portion and the second axis, in a view in the optical axis direction.

16. The camera module of claim 11, wherein the first flexible substrate and the second flexible substrate are disposed symmetrically with respect to a central line dividing the first axis and the second axis and passing the first edge.

17. The camera module of claim 11, wherein the main substrate includes an inner edge surrounding the edge of the sensor substrate, and
wherein the first flexible substrate and the second flexible substrate are disposed between the inner edge of the main substrate and the edge of the sensor substrate.

18. The camera module of claim 11, further comprising:
a first frame configured to tilt with respect to the first axis, in the housing; and
a second frame configured to tilt with respect to the second axis, with respect to the first frame,
wherein the optical assembly is coupled to the second frame.

19. A camera module, comprising:
a housing;
an optical assembly configured to tilt with respect to the housing, and including a lens system and a sensor substrate having an image sensor;
a main substrate disposed in the housing and spaced apart from the sensor substrate; and
a first flexible substrate and a second flexible substrate, different from each other, and configured to connect the sensor substrate to the main substrate,
wherein the first flexible substrate and the second flexible substrate are disposed to at least partially overlap each other in an optical axis direction, and
wherein the first flexible substrate and the second flexible substrate are disposed between an inner edge of the main substrate and edges of the sensor substrate.

* * * * *